US009082325B2

(12) United States Patent
Davis et al.

(10) Patent No.: US 9,082,325 B2
(45) Date of Patent: Jul. 14, 2015

(54) PLATFORM SYSTEM, VIDEO MODULE ASSEMBLY, AND PROCESS OF ASSEMBLING PLATFORM SYSTEM

(75) Inventors: Adam Davis, Leola, PA (US); Frederic Frank Opsomer, Kortemark (BE)

(73) Assignee: Tait Towers Manufacturing LLC, Lititz, PA (US)

( * ) Notice: Subject to any disclaimer, the term of this patent is extended or adjusted under 35 U.S.C. 154(b) by 530 days.

(21) Appl. No.: 13/543,122

(22) Filed: Jul. 6, 2012

(65) Prior Publication Data

US 2013/0235282 A1 Sep. 12, 2013

(30) Foreign Application Priority Data

Mar. 8, 2012 (BE) .................................. 2012/0151

(51) Int. Cl.

| | |
|---|---|
| ***G08B 5/00*** | (2006.01) |
| ***G09F 9/33*** | (2006.01) |
| ***G09F 15/00*** | (2006.01) |
| ***G09F 19/22*** | (2006.01) |
| ***G09F 9/302*** | (2006.01) |
| ***E04G 1/15*** | (2006.01) |
| ***E04G 7/20*** | (2006.01) |
| ***E04G 7/30*** | (2006.01) |
| *H04N 5/64* | (2006.01) |
| *E04B 1/61* | (2006.01) |

(52) U.S. Cl.

CPC .. *G09F 9/33* (2013.01); *E04G 1/15* (2013.01); *E04G 1/152* (2013.01); *E04G 7/20* (2013.01); *E04G 7/301* (2013.01); *G09F 9/3026* (2013.01); *G09F 15/005* (2013.01); *G09F 15/0068* (2013.01); *G09F 19/22* (2013.01); *E04B 1/6183* (2013.01); *E04G 2001/158* (2013.01)

(58) Field of Classification Search

CPC ......... H04N 5/655; H04N 5/64; H04N 5/642; H04N 9/3141; G09F 9/00

USPC .......................................................... 348/839

See application file for complete search history.

(56) References Cited

U.S. PATENT DOCUMENTS

| | | | | |
|---|---|---|---|---|
| 2,844,344 | A * | 7/1958 | Streb et al. | 108/53.5 |
| 5,485,055 | A * | 1/1996 | Keyser | 313/505 |
| 6,490,011 | B1 * | 12/2002 | Cooper et al. | 348/839 |
| 6,615,549 | B1 * | 9/2003 | Hodge et al. | 52/7 |
| 7,109,881 | B2 * | 9/2006 | Blum et al. | 340/815.4 |
| 7,122,751 | B1 * | 10/2006 | Anderson et al. | 200/85 R |
| 7,205,903 | B2 * | 4/2007 | Blum et al. | 340/815.4 |
| 7,703,401 | B2 * | 4/2010 | Davis et al. | 108/156 |
| 8,724,297 | B2 * | 5/2014 | Tho | 361/679.01 |
| 2004/0001002 | A1 * | 1/2004 | Blum et al. | 340/573.1 |
| 2004/0001679 | A1 * | 1/2004 | Sisodia et al. | 385/120 |

(Continued)

FOREIGN PATENT DOCUMENTS

| | | | |
|---|---|---|---|
| CN | 202139799 | U | 2/2012 |
| JP | 11073140 | A | 3/1999 |

(Continued)

*Primary Examiner* — Sath V Perungavoor

*Assistant Examiner* — Howard D Brown, Jr.

(74) *Attorney, Agent, or Firm* — McNees Wallace & Nurick LLC

(57) ABSTRACT

A platform system having a video module assembly. The video module assembly includes a receiving member and a first video module removably secured to the receiving member. The video module includes an array of light emitting devices, and the receiving member is configured to directly or indirectly detachably secure a second video module.

20 Claims, 20 Drawing Sheets

(56) References Cited

U.S. PATENT DOCUMENTS

| | | | | |
|---|---|---|---|---|
| 2004/0004827 | A1* | 1/2004 | Guest | 362/31 |
| 2004/0021617 | A1* | 2/2004 | Blum et al. | 345/1.3 |
| 2004/0100796 | A1* | 5/2004 | Ward | 362/231 |
| 2004/0119602 | A1* | 6/2004 | Blum et al. | 340/815.4 |
| 2007/0266908 | A1* | 11/2007 | Monteith et al. | 108/53.1 |
| 2008/0055105 | A1* | 3/2008 | Blum et al. | 340/815.4 |
| 2008/0315768 | A1* | 12/2008 | Yamakita et al. | 313/586 |
| 2009/0301359 | A1* | 12/2009 | Tait et al. | 108/56.3 |
| 2011/0317116 | A1* | 12/2011 | Kawamura | 349/123 |
| 2012/0313862 | A1* | 12/2012 | Ko et al. | 345/173 |
| 2013/0067829 | A1* | 3/2013 | Johnstone | 52/7 |

FOREIGN PATENT DOCUMENTS

| | | | |
|---|---|---|---|
| WO | 2009151655 | A1 | 12/2009 |
| WO | 2010126466 | A1 | 11/2010 |

* cited by examiner

PLATFORM SYSTEM, VIDEO MODULE ASSEMBLY, AND PROCESS OF ASSEMBLING PLATFORM SYSTEM

FIELD OF THE INVENTION

The present invention is directed to platform systems and processes of assembling platform systems. In particular, the present disclosure is directed to platform systems with video modules and processes of assembling platform systems with video modules.

BACKGROUND OF THE INVENTION

It is desirable for stages and platforms to be capable of assembly and disassembly into relatively small units that can be compactly and quickly loaded onto trucks or airplanes for transport. It is also desirable for the structures to be capable of being assembled and disassembled by individuals with little or no technical skill, to be capable of supporting a large amount of weight, and/or be resistant to external conditions, such as lateral forces, loud vibrations, and substantial wear, and/or be capable of displaying complex sequenced moving video images to provide effects to enhance stage performances, and/or other desired features.

Known stages and platforms can require use of tools, such as wrenches or screwdrivers, and/or hammers for assembly and/or disassembly. Locking mechanisms for supports have been used; however, they are difficult to assemble and disassemble, subject to misalignment, require a plurality of pieces, require tools for certain adjustments, do not offer adequate stability, do not have easily replaceable parts, and do not work well in conjunction with other parts of the stage or platform structures.

What is needed is a platform system, a video module assembly, and a process of assembling a platform system that do not suffer from one or more of the above drawbacks and/or including one or more of the desired capabilities.

BRIEF DESCRIPTION OF THE INVENTION

According to an embodiment, a platform system includes a video module assembly. The video module assembly includes a receiving member and a first video module removably secured to the receiving member. The video module includes an array of light emitting devices, and the receiving member is configured to directly or indirectly detachably engage a second video module.

According to an embodiment, a video module assembly includes receiving member and a first video module removably secured to the receiving member. The video module includes an array of light emitting devices, and the receiving member is configured to directly or indirectly detachably secure a second video module. The receiving member has a casing including a support cone configured to receive a tapered portion of a support. The support cone has a tapered inner surface and a tapered outer surface. The outer surface and the casing forming a cavity capable of receiving a corresponding tapered footing structure. The inner surface and outer surface are engagable with mating tapered surfaces. At least one of the tapered surfaces is the tapered portion.

According to an embodiment, method of assembling a platform system includes providing a platform system comprising a receiving member and a first video module removably secured to the receiving member. The video module includes an array of light emitting devices, and the receiving member is configured to directly or indirectly detachably engage a second video module. The method includes providing a support. The receiving member includes a casing having a support cone configured to receive a tapered portion of the support. The support cone has a tapered inner surface and a tapered outer surface. The outer surface and the casing forming a cavity capable of receiving a corresponding tapered footing structure. The inner surface and outer surface are engagable with mating tapered surfaces. At least one of the tapered surfaces is the tapered portion. The method includes directing the support into the receiving member to provide engagement therewith.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Provided is a platform system, a video module assembly, and a method of assembling a platform system. Embodiments of the present disclosure permit ease of assembly and disassembly, reduce or eliminate assembly errors, increase stability of (for example, by reducing swaying, bending, and other lateral forces), permit individuals with little or no technical skill to assemble and/or disassemble platform systems, permits assembly and/or disassembly by hand, or combinations thereof.

Figure 1B:
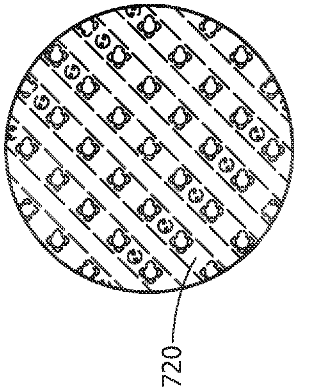
FIG. 1B shows an enlarged view of a portion of FIG. 1A.
Figure 1A:
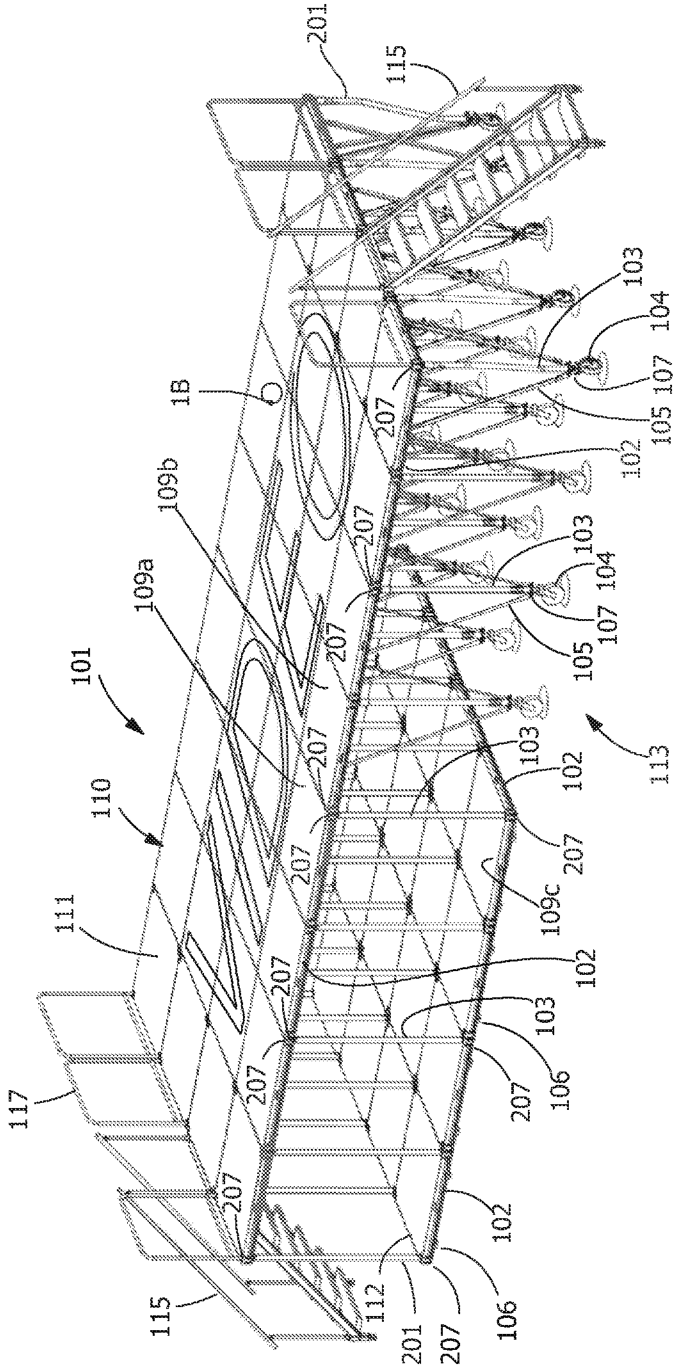
FIG. 1A shows a top perspective view of a platform system according to the disclosure.

FIG. 1A shows an embodiment of a platform system 101 including a video module assembly 102. The video module assembly 102 shown includes a receiving member 207 and a plurality of video modules 109 (enlarged in FIG. 1B). In one embodiment, only one of the video modules 109 is included. In other embodiments, more than one of the video modules 109 are included. In one embodiment, the receiving member 207 engages one or more supports 103 (see also FIG. 2). The supports 103 are elongate structures having a laterally stabilizing support structure 107 and an elongate portion 201 (for example, a cylindrical tube).

Figure 21B:
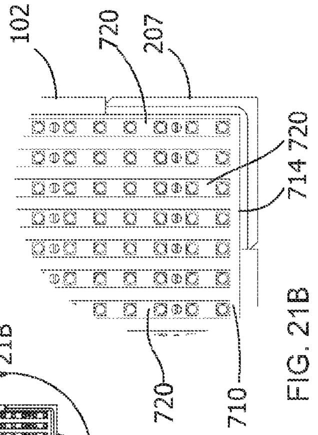
FIG. 21B shows a partial enlarged top view of a video module assembly with the deck removed according to the disclosure.
Figure 21A:
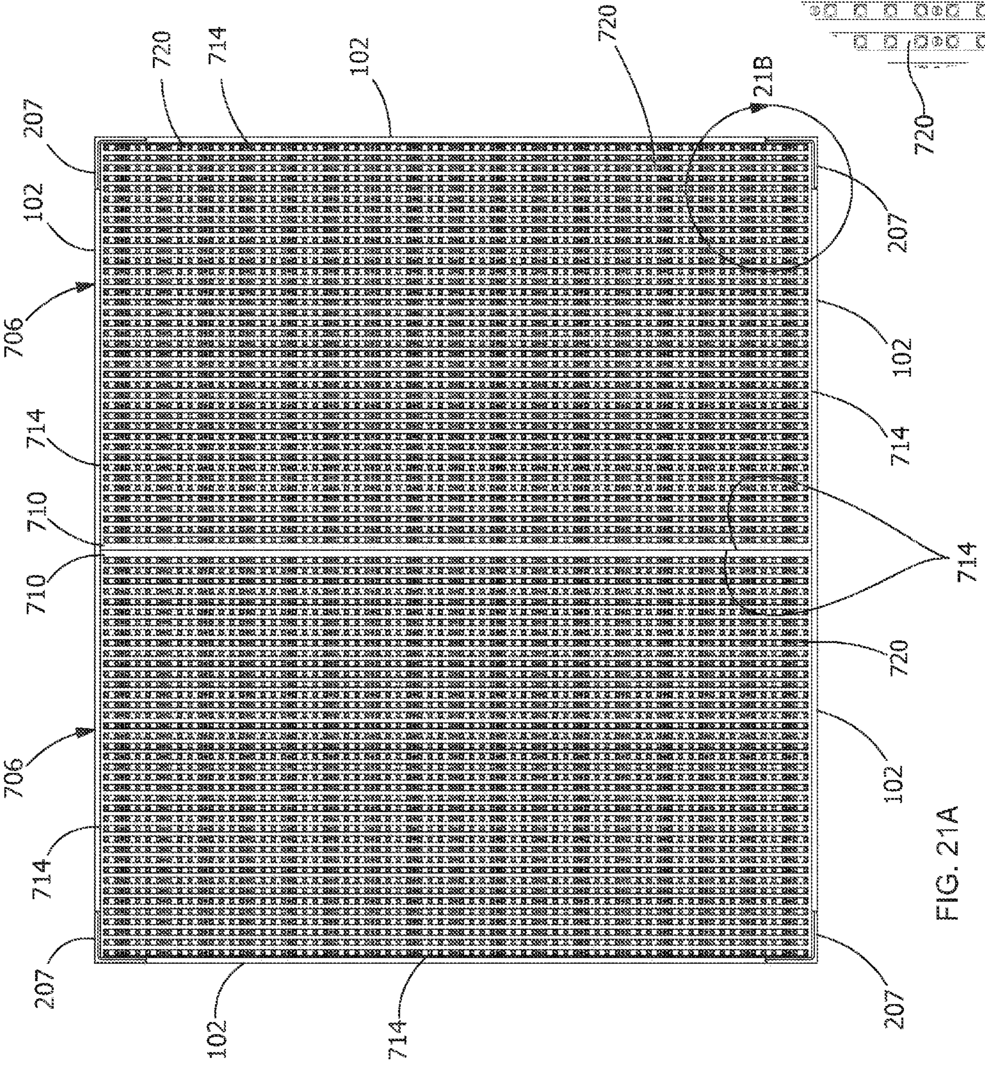
FIG. 21A shows a top view of a video module assembly with the deck removed according to the disclosure.

The video module 109 includes an array of light emitting devices 720 (see also FIGS. 21A and 21B). The receiving member 207 is configured to directly or indirectly detachably secure a plurality of the video modules 109. For example, as shown in FIG. 1A, in one embodiment, receiving member **207*a* directly secures a first video module 109*a* to a second video module 109*b* and/or indirectly secures a third video module 109*c* to the first video module 109*a* and/or the second video module 109*b*. As will be appreciated, in other embodiments, any number of the video modules 109 are capable of being secured by the receiving members 207**.

In one embodiment, the receiving members 207 are arranged along the video module assembly 102. In one embodiment, the receiving members 207 are attached to the video module assemblies 102 by welding and/or by any other suitable attachment, such as, by fastening mechanism.

Figure 20:
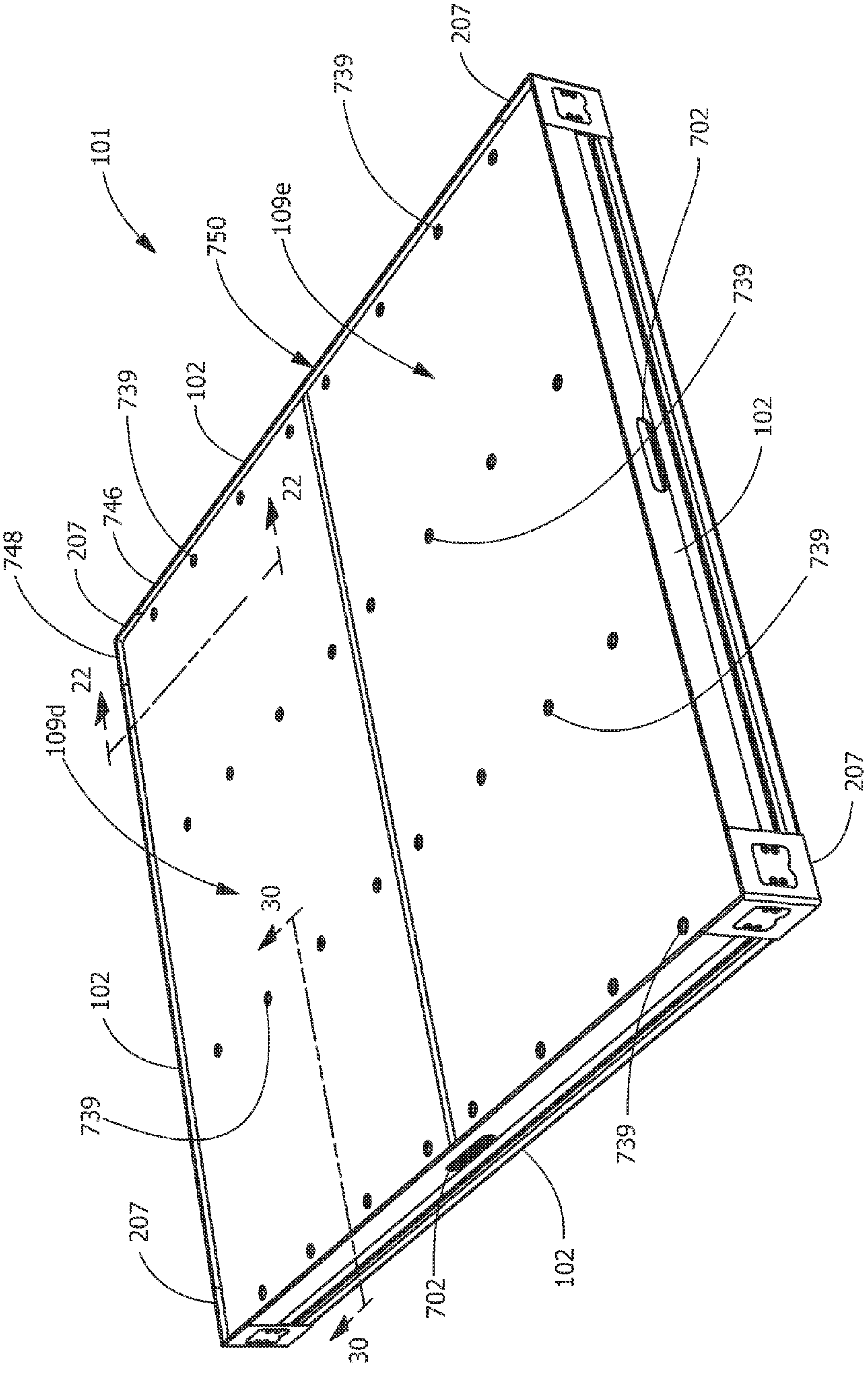
FIG. 20 shows a top perspective view of a video module assembly according to the disclosure.

Referring to FIG. 20, in one embodiment, the platform system 101 includes the video module assembly 102 with the video module 109 being removably secured to and supported by the receiving member 207. The video module assembly 102 is configured to secure at least one video module 109. In one embodiment, the video module assembly 102 is configured to secure the plurality of the video modules 109, for example, a fourth video module **109*d* and a fifth video module 109*e*. In further embodiments, the video module assembly 102 is configured to secure three video modules 109, four video modules 109, or more. In one embodiment, the video module assembly 102 is modular and is configured for use with any type of panel module capable of supporting a predetermined structural load. For example, in one embodiment, one or more of the plurality of the video modules 109** is temporarily or permanently replaced with a non-video module or a non-video module is otherwise included. Suitable non-video modules include, but are not limited to, mirrors, opaque modules, wood modules, grating, polymeric modules, trap door modules, elevator modules, pyrotechnic chambers, modules housing chambers (for example, with water, inside), or combinations thereof.

Figure 14B:
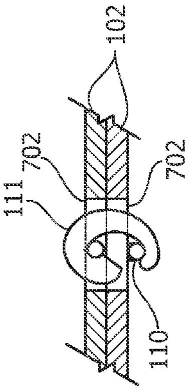
FIG. 14B shows an enlarged cutaway top view of adjacent video module assembly connectors according to the disclosure.
Figure 24:
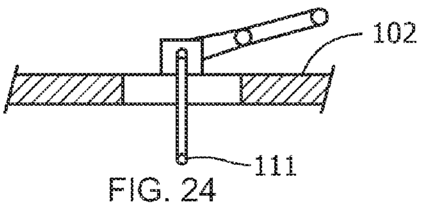
FIGS. 24 and 25 show partial top section views of a latch connector according to the disclosure.
Figure 25:
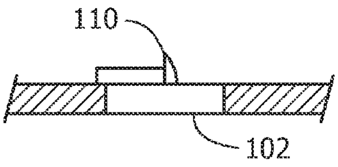
Figure 26:
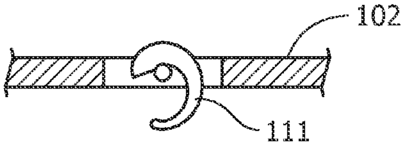
FIGS. 26 and 27 show partial top section views of a coffin lock connector according to the disclosure.
Figure 27:
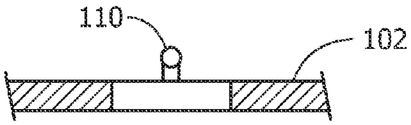
Figure 28:
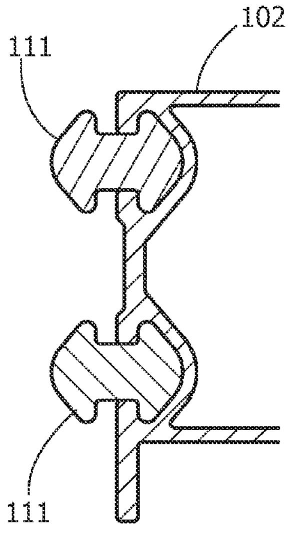
FIGS. 28 and 29 show partial side section views of a spline connector according to the disclosure.
Figure 29:
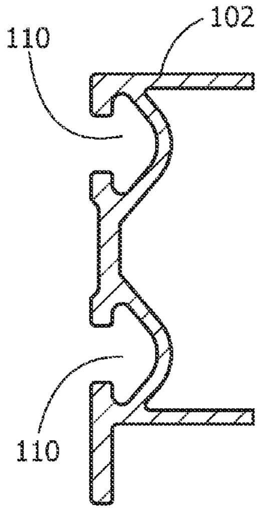

In one embodiment, the video module assembly 102 includes a connector 702. The connector 702 secures the video modules 109 and/or the video module assembly 102. The connector 702 provides support and stability, for example, by providing constant force, for example, by clamping, drawing, or otherwise providing force to urge the video modules 109 and/or the video module assemblies 102 together. For example, as shown in FIG. 14B, in one embodiment, the connector 702 includes a rotatable latch member 111 and/or a receiving mechanism 112, thereby providing stable, locked engagement. In one embodiment, as shown in FIGS. 24 and 25, the connector 702 is or includes a latch connector. In one embodiment, as shown in FIGS. 26 and 27, the connector 702 is or includes a coffin lock connector. In one embodiment, as shown in FIGS. 28 and 29, the connector 702 is or includes a spline connector.

Figure 22:
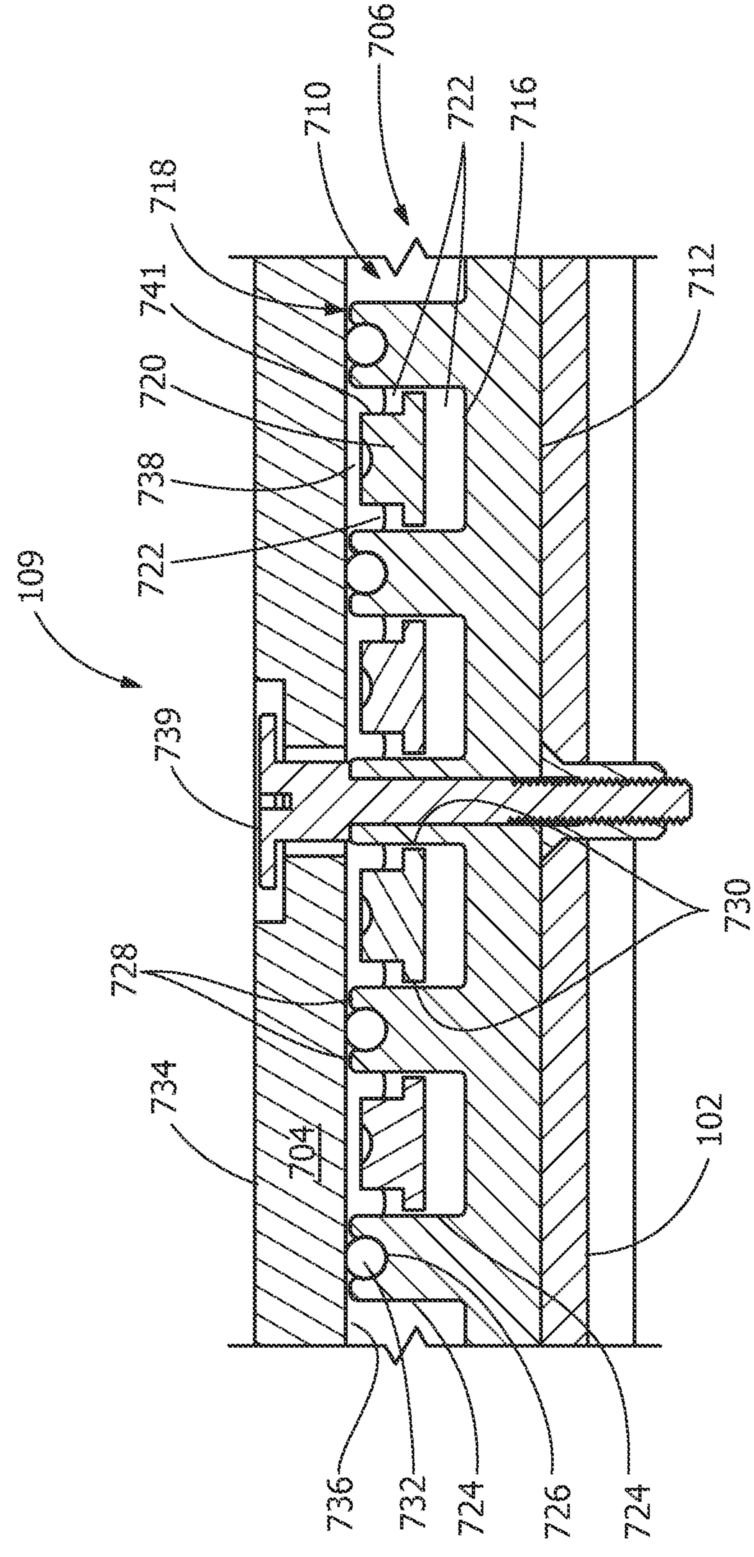
FIG. 22 shows a cross-sectional view of a video module according to the disclosure.

Referring to FIGS. 21A-B and 22, in one embodiment, the video module 109 includes a contoured video panel 706. The contoured video panel 706 includes a support portion 710 and a perimeter 714 extending around the support portion 710. During assembly of the platform system 101, the contoured video panel 706 is installed in the video module assembly 102 such that one or more sides of the perimeter 714 engage or abut the video module assembly 102.

Referring to FIG. 22, in one embodiment, the support portion 710 includes at least one channel 716 and at least one protrusion member 718. In one embodiment, the channels 716 are arranged to run parallel or substantially parallel to and between the protrusion members 718, to form a contoured surface on the support portion 710. In one embodiment, the channels 716 are configured to house the light emitting devices 720. In one embodiment, the light emitting devices 720 are LED strips, for example, or any other suitable light emitting devices are capable of producing a moving image or video display. In one embodiment, the light emitting devices 720 are tri-color LEDs. In one embodiment, the light emitting devices 720 are secured within the channels 716 by mounting material 722, for example, or any other suitable material that provides heat dissipation, attachment, and vibration isolation. In one embodiment, the video module 109 includes an array of light emitting devices 720 arranged and disposed in a predetermined pattern. In one embodiment, a plurality of the light emitting devices 720 are arranged and disposed to provide coverage of a majority of the planar surface area of the support portion 710.

In one embodiment, the protrusion members 718 include opposing sidewalls 724, and at least one groove 726 formed within opposing surface ridges 728. In one embodiment, the light emitting devices 720 are arranged and disposed within the channels 716 such that their longitudinal edges 730 abut the sidewalls 724 on either side of the channels 716. In one embodiment, at least one dampening rod 732 is arranged and disposed in the groove 726. In one embodiment, the dampening rod 732 is removably secured in the groove 726 by a friction fit and/or by any other suitable attachment, such as, by adhesive, fasteners, or by tactile surface adhesion. In one embodiment, the groove 726 and surface ridges 728 are configured in any suitable geometry to receive the dampening rod 732. In one embodiment, the ratio of the thickness of the deck 704 to the thickness of the protrusion members 718 is between about 0.75 to about 2, between about 1 and about 2, between about 1 and 1.5, between about 1.5 and about 2, or any suitable combination or sub-combination thereof.

The deck 704 includes an exposed surface 734 and a concealed surface 736. In one embodiment, the dampening rod 732 and the surface ridges 728 are capable of maintaining a space gap 738 between the concealed surface 736 and the upper portion 741 of the light emitting devices 720. The space gap 738 provides heat dissipation and clearance protection for the light emitting devices 720. In one embodiment, the dampening rod 732 and the surface ridges 728 are capable of providing vibration dampening at the concealed surface 736 which reduces noise and impact stresses transmitted by and through the deck 704. In one embodiment, the dampening rods 732 are configured to elevate the deck 704 above the surface ridges 728. In one embodiment, the deck 704 is attached to video module assembly 102 by fasteners 739 (see also FIG. 20), for example, or by any other suitable attachment.

Figure 23:
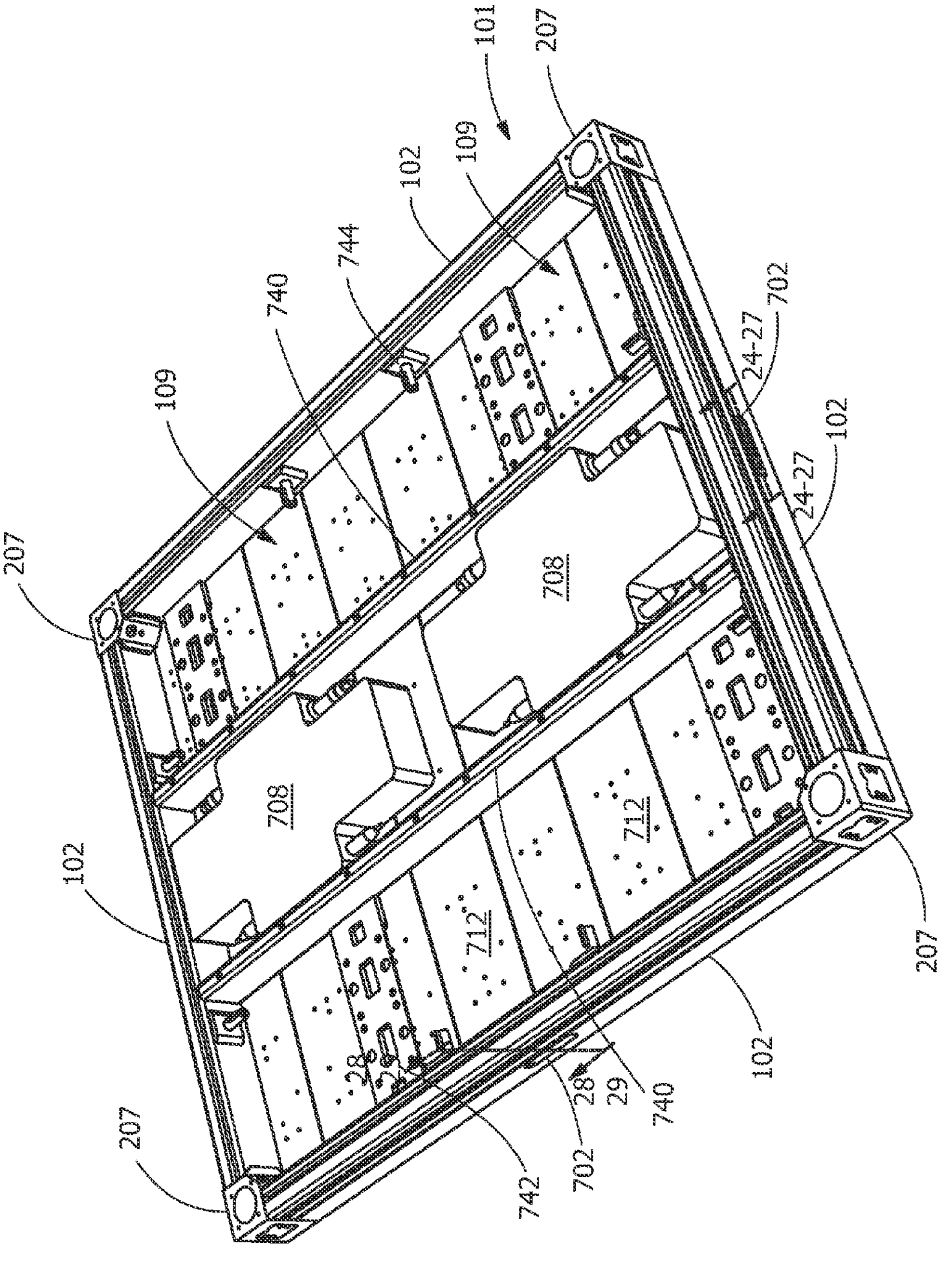
FIG. 23 shows a perspective view of a video module assembly without the video module according to the disclosure.

Referring to FIG. 23, in one embodiment, the video module assembly 102 includes at least one cross member 740 arranged and disposed substantially perpendicular to two oppositely disposed members of the video module assembly 102. The cross members 740 are configured to engage and support the video module 109 and to provide rigidity and bracing for the video module assembly 102. In one embodiment, the video module assembly 102 includes at least one support plate 742 arranged and disposed substantially perpendicular to and between the video module assembly 102 and the cross members 740.

In one embodiment, the video module assembly 102 and the receiving members 207 include exterior flanges 746 and 748, respectively. The exterior flanges 746 and 748 combine to form an edge 750 of the video module assembly 102. During assembly of the platform system 101, the contoured video panel 706 is installed in the video module assembly 102 such that one or more sides of the perimeter 714 engages or abuts the edge 750.

Figure 30:
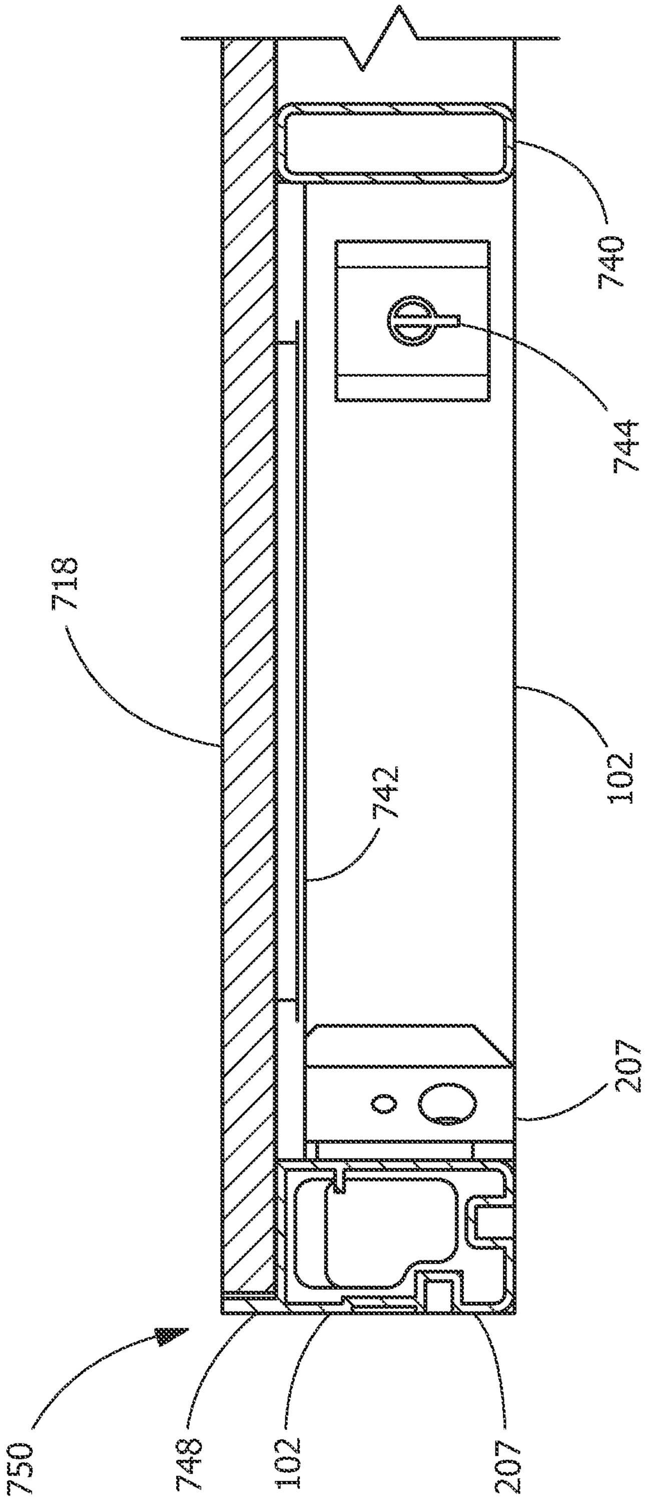
FIG. 30 shows a cross-sectional view of a video module assembly according to the disclosure.

Referring to FIG. 30, in one embodiment, the control panel 708 is configured to engage with and be removably secured to the control surface 712 of the contoured video panel 706. In one embodiment, the control panel 708 is arranged and disposed on the control surface 712 such that the control panel 708 aligns between two adjacent cross members 740 during assembly of the platform system 101. The control panel 708 is configured to provide electrical power and control signals to the light emitting devices 720. In one embodiment, a plurality of the control panels 708 are configured capable of being remotely controlled. The remote controlling provides a control sequence to the video modules 109 to produce a predetermined or preprogrammed moving video image through control and sequencing of the individual light emitting devices 720. In one embodiment, the control panels 708 are configured for producing a predetermined or preprogrammed moving video image through control and sequencing of the individual light emitting devices 720. In another embodiment, the light emitting devices 720 are preprogrammed to display video corresponding to a live feed, for example, from a live concert.

In one embodiment, the deck 704 is fabricated of a transparent polycarbonate with a scratch and UV resistant, antireflective coating, or any other suitable durable transparent or semi-transparent or semi-translucent material capable of supporting a predetermined structural load. In one embodiment, the contoured video panel 706 is fabricated of a durable, moldable polymeric material, or any other suitable material capable of supporting a predetermined structural load. The video module 109 is configured to support predetermined structural loads that may include loads received from forces transmitting by performers' and/or equipments' weights or performance impacts. The protrusion members 718, channels 716, and dampening rods 732 are configured with any suitable structural geometry to form a contoured surface on the support portion 710 that can deform or deflect in support of both the normal and the lateral components of forces applied to the deck 704 while maintaining clearance protection of the light emitting devices 720. The deformation or deflection capability of the video module 109 provides vibration and noise dampening.

In one embodiment, the dampening rod 732 is fabricated of elastomeric material (for example, rubber), or any other suitable material capable of providing vibration and noise dampening. In one embodiment, the dampening rod 732 is of an elongated cylindrical shape, but may have other suitable cross sections, such as oval, oblong, rectilinear, or triangular. In one embodiment, the dampening rod 732 is a composition applied in a fluid, gel, or foam, or any other suitable form that partially or substantially fills the groove 726 and is capable of being deformed when loaded in use. In one embodiment, the dampening rod 732 includes interior or exterior protrusions, such as ridges or ribs for structural or dampening support. In one embodiment, the dampening rod 732 includes interior support bracing structure, such as an interior linear wall. In one embodiment, the dampening rod 732 cross section is a biased undulating shape, such as an "S", "Z", "M" or other similar shape.

Figure 14A:
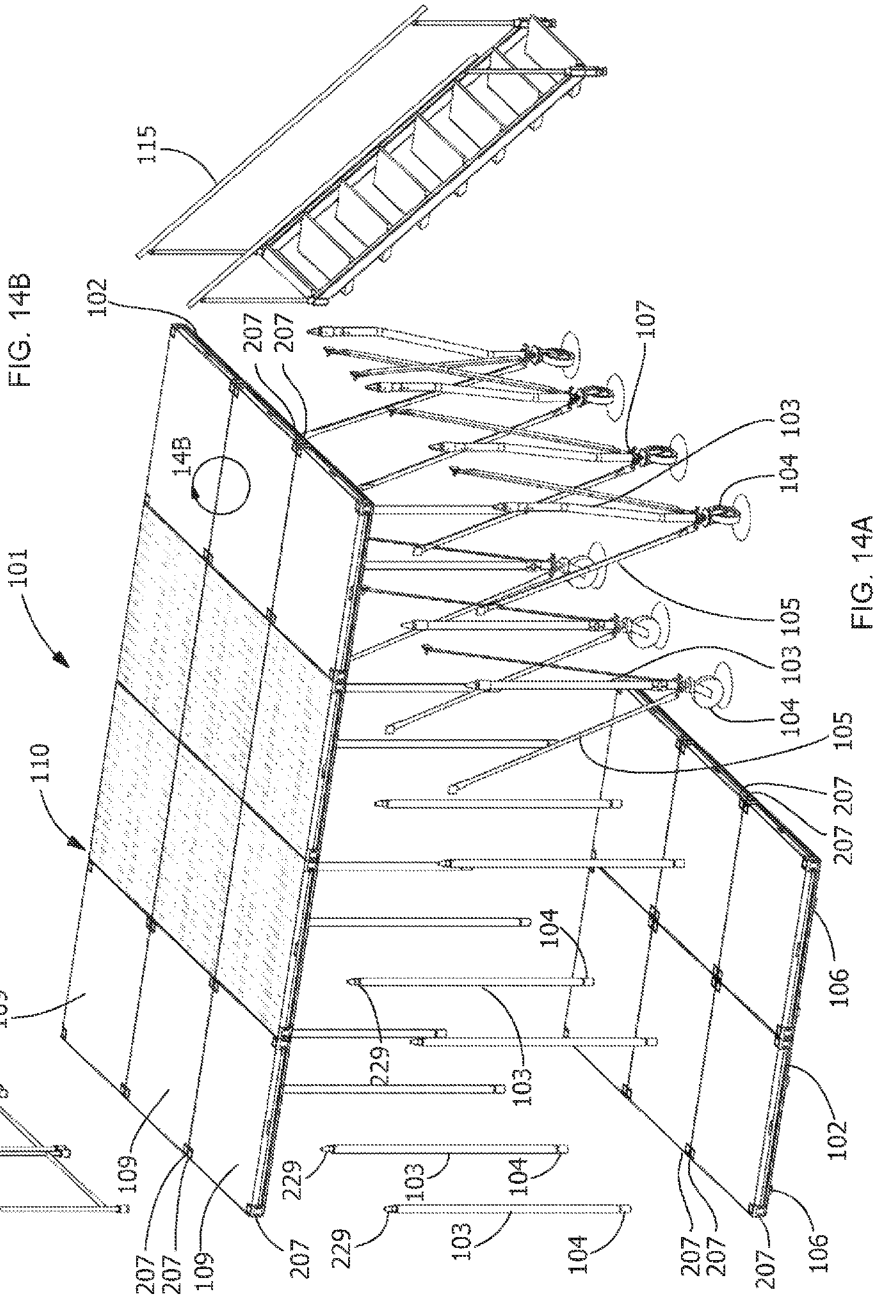
FIG. 14A shows an exploded view of a platform system according to the disclosure.

The platform system 101 is capable of attachment to the supports 103 and the laterally stabilizing supports 105 to form the platform system 101 (see FIGS. 1A and 14A). The receiving members 207 are configured for quick connection to the supports 103 to provide for quick assembly or quick change out of the platform systems 101.

The supports 103 include any suitable material. In one embodiment, one or more of the supports 103 is a lightweight material (for example, lighter than stainless steel) and/or a durable material (for example, having a durability comparable to stainless steel) that can withstand external environmental conditions (for example, rain, snow, sleet, freezing rain, hail, wind, temperature shifts from below freezing to above freezing, temperature shifts from below freezing to 100 degrees Fahrenheit, any other conditions, or any combination thereof).

In one embodiment, one or more of the supports 103 includes a coating or is of a material capable of receiving a coating without delamination of the coating. Additionally or alternatively, in one embodiment, the supports 103 have substantially identical dimensions and/or are identifiable by colors or other suitable representations to reduce or eliminate assembly errors.

The receiving member 207 of the support 103 is capable of being detached and reattached, for example, by hand and/or by tool, from the elongate portion 201. For example, in one embodiment, grooves, features, and interlocking features are utilized to provide engagement between the elongate portion 201 of the support 103 and receiving member 207. The laterally stabilizing support structure 107 is capable of being secured, for example, by hand and/or by tool, to a laterally stabilizing support 105. The receiving member 207 and/or the laterally stabilizing support 105 directly or indirectly engage the video module 109.

Figure 3:
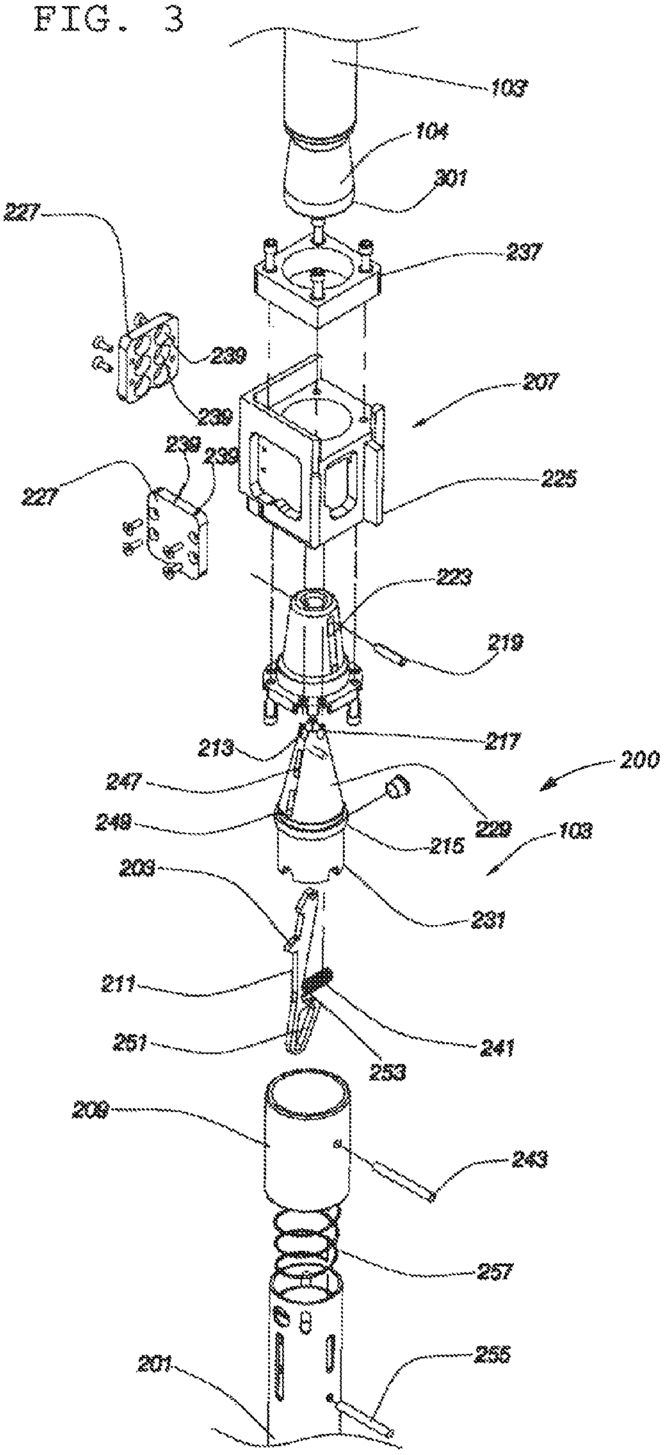
FIG. 3 shows an exploded view of a support, and a corresponding receiving member according to the disclosure.
Figure 2:
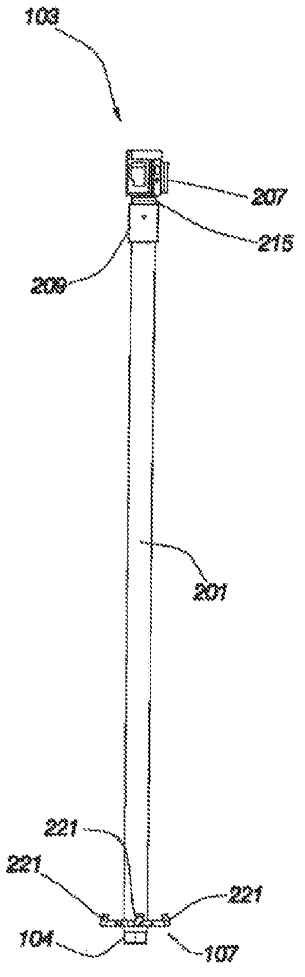
FIG. 2 shows an elevational view of a support according to the disclosure.

FIGS. 2 and 3 shows an embodiment of the support 103 engaged with a receiving member 207. In the embodiment, the support 103 includes the elongate portion 201, a locking mechanism 200, and a footing structure 104. The support 103, as shown in FIG. 2, is substantially a cylindrical support but could be of any geometry capable of supporting the video module assembly 102 and video modules 109 and loads provided thereon.

Figure 4:
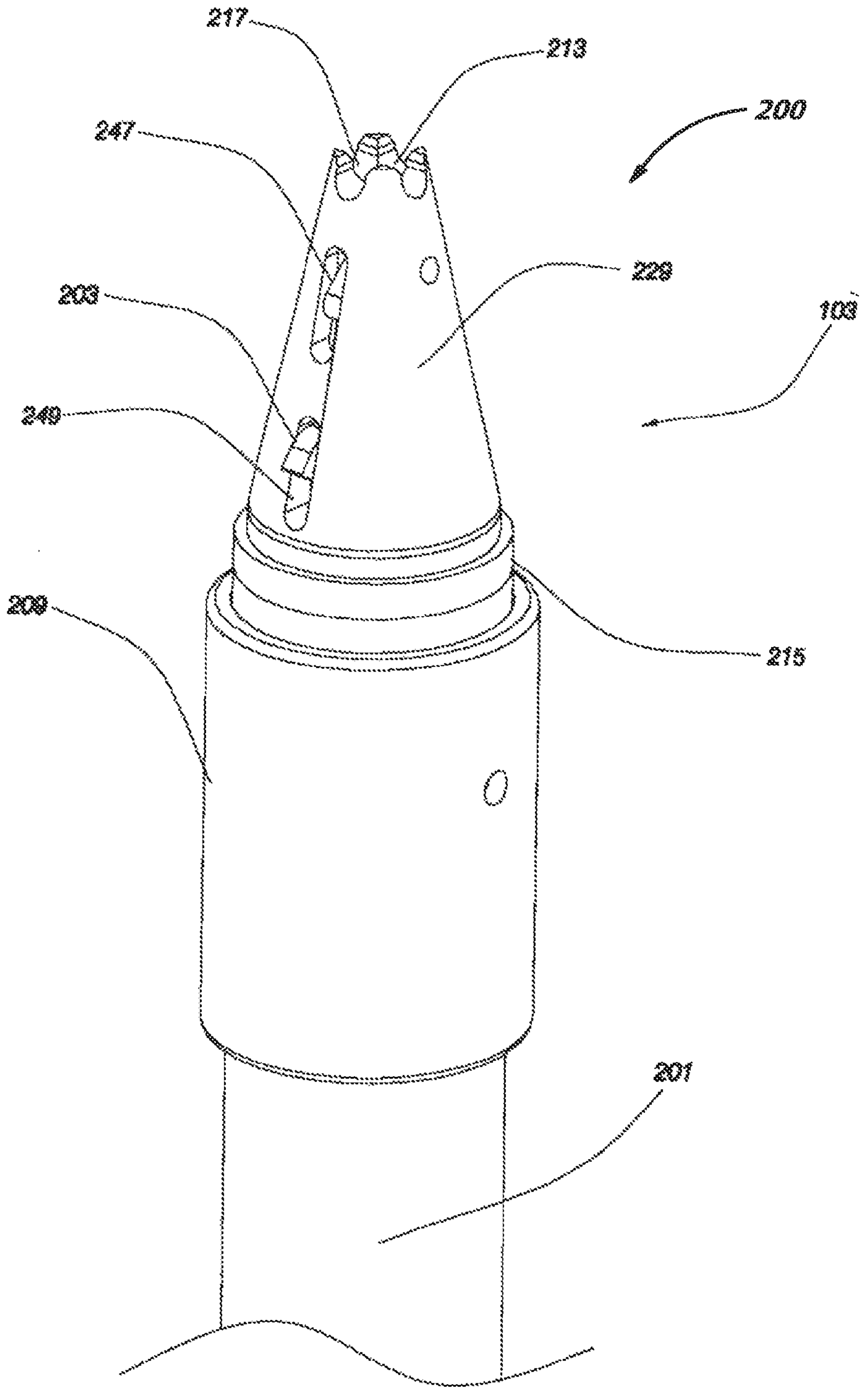
FIG. 4 shows a partial view of a support locking mechanism according to the disclosure.

Referring to FIG. 4, in one embodiment, a tapered portion 229 of the support 103 is attached to or unitarily formed at an end of the elongate portion 201. Additionally or alternatively, a footing structure 104 is attached to an end of the elongate portion 201 opposite tapered portion 229. As shown in FIG. 2, the tapered portion 229 engages the receiving member 207.

Referring to FIG. 3, in one embodiment, the locking mechanism 200 includes a retention device 211, a latching feature 203, an alignment member 213, a flange 215, a tapered portion 229, an attachment portion 231, and one or more channels 217.

In one embodiment, as shown in FIG. 1, the supports 103 of the platform system 101 in the single level portion 113 include the locking mechanism 208. As shown in FIG. 3, in one embodiment, the locking mechanism 200 is capable of being positioned in multiple orientations by lining up channel 217 with the pin 219 of the receiving member 207.

In one embodiment, the support 103 includes a releasing mechanism 209 arranged along a surface of the elongate portion 201. In one embodiment, the releasing mechanism 209 is arranged as a sleeve or otherwise gripable structure that is manipulatable by hand and/or is capable of being operated by hand to disengage the retention device 211 and the latching feature 203.

In one embodiment, the latching feature 203 is or includes a latch, protrusion, or other feature of the retention device 211 that engages one or more surfaces of the receiving member 207. For example, in one embodiment, the latching feature 203 extends through the tapered portion 229 and provides a surface extending therefrom that is capable of engaging a surface of the receiving member 207. In one embodiment, a series of mounting pins 243 and springs 241 are operably mounted to provide the releasably pivotable structure of the retention device 211 and the releasing mechanism 209. However, the structure of the support is not limited to the particular arrangement shown in FIG. 3.

In one embodiment, the locking mechanism 200 includes a retention device 211 and the latching feature 203, an attachment portion 231, and the alignment member 213, which further comprises at least one channel 217. In one embodiment, the tapered portion 229 is capable of being manually inserted into the receiving member 207. Upon inserting the tapered portion 229 into the receiving member 207, a pin 219 in the receiving member is lined up with the channel 217 in the locking mechanism 200 to position the orientation of the locking mechanism 200 in relation to the receiving member 207. In one embodiment, the locking mechanism 200 produces an audible clicking noise indicating that it is properly engaged to the receiving member 207. Upon fully inserting the locking mechanism 200 into the receiving member 207, the retention device 211 engages a catch in the receiving member 207. The catch is a hole, a slot, a groove, a notch or any other structure or feature allowing for the latching feature 203 to releasably attach lip 218 of the receiving member 207. In one embodiment, to disengage the locking mechanism 200, the releasing mechanism 209 is manually adjusted, resulting in the retention device 211 disengaging the latching feature 203 from the receiving member 207.

In one embodiment, the locking mechanism 200 includes a pin 245 secured in the tapered portion 229 that provides a pivotable connection with the retention device 211. In one embodiment, the support includes an upper slot 247 and a lower slot 249 in the tapered portion 229. The upper slot 247 provides visibility of the interior of tapered portion 229 to simplify installation of the pin 245 through the retention device 211. The latching feature 203 extends through the lower slot 249 to permit engagement with the lip 218 (see FIG. 5) on the receiving member 207.

Figure 5:
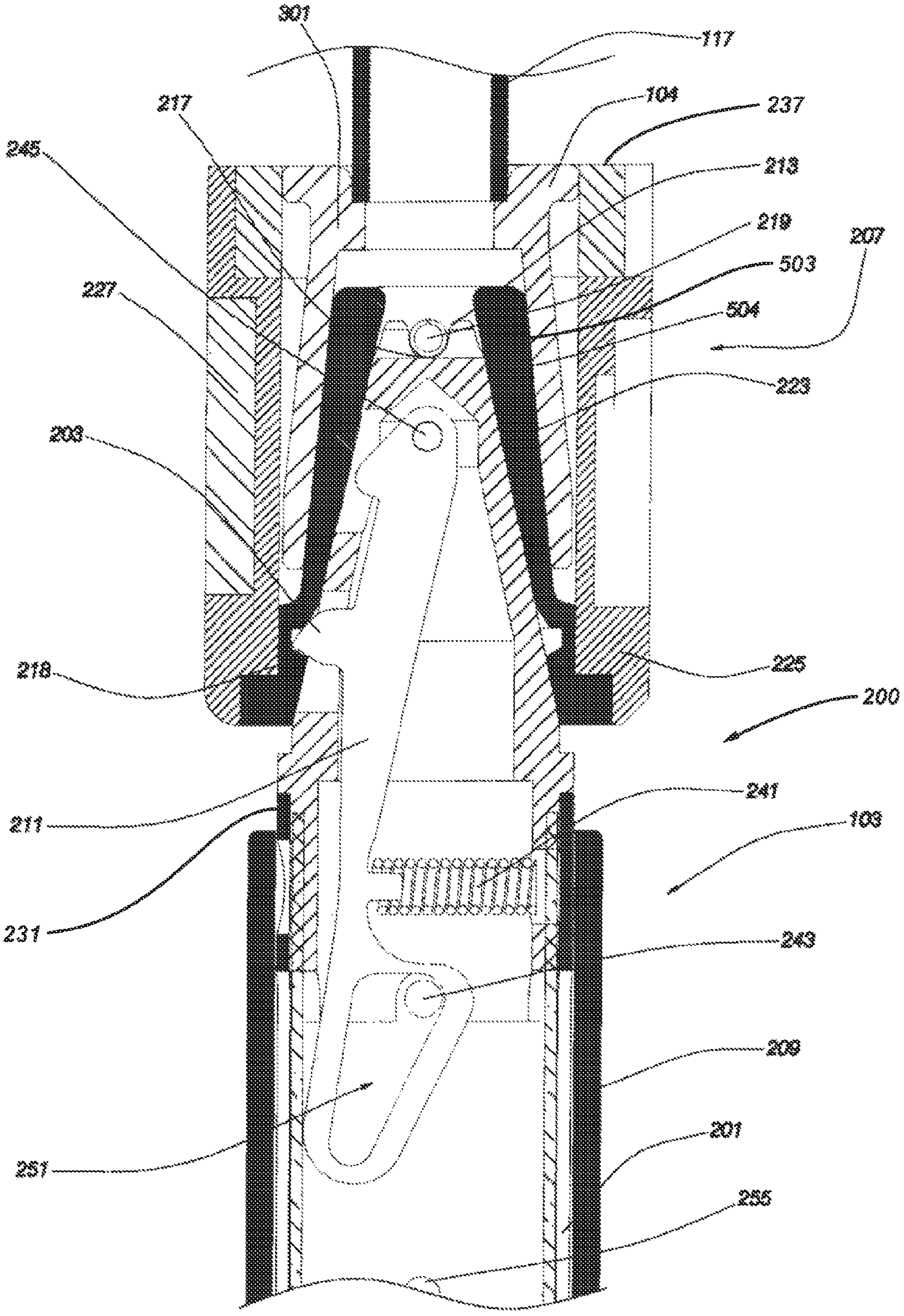
FIG. 5 shows a cross-sectional view of a support in engagement with a receiving member according to the disclosure.

Referring to FIG. 5, in one embodiment, the locking mechanism 200 includes an opening 251 in the retaining device 211 to receive the pin 243 that is secured in the releasing mechanism 209. Disposed between the opening 251 and the latching feature 203 is a protrusion 253 that is configured to receive spring 241. The spring 241 urges the retention device 211 to pivot about the pin 245 so that the latching feature 203 extends through the tapered portion 229. In one embodiment, the locking mechanism 200 includes a spring 257 disposed between a pin 255 secured in the elongate portion 201 and pin 243 secured in the releasing mechanism 209. The spring 257 urges the releasing mechanism 209 to move along the elongate portion 201 toward the tapered portion 229.

In one embodiment, in response to the receiving member 207 being aligned and directed over and into engagement with the tapered portion 229 of the support 103, the inside surface of the support cone 223 makes contact with the latching feature 203. Further directed movement of the receiving number 207 with respect to the support 103 urges the latching feature 203 to pivotably retract through the lower slot 249 sufficiently to permit the latching feature 203 to engage the lip 218. This engagement, normally accompanied by an audible "click", secures the receiving member 207 to the support 103.

In one embodiment, to release the receiving member 207 from the support 103, application of a sufficient force applied to the releasing mechanism 209 in a direction away from the tapered portion 229 urges the releasing mechanism 209 away from the tapered portion 229. The pin 243 engages the opening 251, compressing the spring 241, and urging or actuating the retention device 211 to pivotably move about the pin 245 so that the latching feature 203 recedes within the slot 249. After the latching feature 203 sufficiently recedes to disengage the lip 218, the receiving member 207 is separated from the support 103.

In one embodiment, the tapered portion 229 of the support 103 resembles a tapered or frusto-conical geometry. The tapered portion 229 is not limited to a frusto-conical shape, and is capable of including a conical, pyramidal or other tapered geometry capable of transmitting loads at non-perpendicular angles. The tapered portion 229 provides an angle that allows resistance to lateral forces when engaged with receiving member 207. Further, the tapered portion 229 assists in alignment and ease of assembly.

The attachment portion 231 of the support 103 is attached to the elongate portion 201 in any suitable manner. In one embodiment, the attachment portion 231 is shrink-fitted into a hollow support portion by heating the elongate portion 201 to a temperature sufficient to cause the elongate portion 201 to expand to a diameter sufficient to permit the fitting of the attachment portion 231, wherein the elongate portion 201 is cooled to tighten the connection. In one embodiment, the attachment portion 231 includes a flange 215 to permit attachment of the attachment portion 231 to the elongate portion 201 and alignment of the attachment portion 231 to the receiving member 207 during assembly.

In one embodiment, the receiving member 207 includes a support cone 223, a pin 219, and a casing 225. In one embodiment, the support cone 223 is geometrically configured to allow the locking mechanism 200 to substantially fit within the support cone 223. In one embodiment, the pin 219 is replaceably affixed within the support cone 223 to allow at least one of the channels 217 of the locking mechanism 200 to engage the pin 219. In one embodiment, the casing 225 includes a geometry that allows the support 103 to support the video module 109 (see FIG. 1A), the platform system 101, or other suitable planar or substantially planar surface.

In one embodiment, the casing 225 of the receiving member 207 includes at least one magnetic panel 227. The magnetic panel 227 includes a plurality of magnets 239 that are arranged to magnetically attract adjacent receiving members 207. In one embodiment, the magnetic panel 227 includes six magnets 239 having alternating polarities of north and south. For example, in one embodiment, the magnets 239 are arranged in a north-south-north arrangement in a first set and a south-north-south arrangement in a second, adjacent set. The arrangement of alternating magnetic polarities permits the simultaneous attraction and alignment along multiple directions from receiving members 207 having magnets 239 arranged in a corresponding arrangement.

In one embodiment, the receiving member 207 further includes a pin 219. The pin 219 is of a geometry configured to mate channel 217 of the locking mechanism 200 and provide rotational positioning of the support 103. The locking mechanism 200 includes a single pin 219 or multiple pins 219. The pin 219 has a cylindrical geometry, a cuboid geometry, or any other suitable geometry. In one embodiment, during the initial assembly of the receiving member 207, the pin 219 is inserted into two cavities on opposite sides of the support cone 223. The pin 219 is capable of being removed or replaced allowing the remaining parts of the receiving member 207 to be used if the pin 219 becomes damaged. In one embodiment, the location of the pin 219 in the support cone 223 is as close to the distal end of the support cone 223 in relation to the elongate portion 201 as possible. In another embodiment, instead of having the pin 219, the receiving member 207 is configured with at least one alternate channel corresponding to the channel 217 of the alignment member 213.

In one embodiment, the support cone 223 of the receiving member 207 has a geometry substantially similar to the tapered portion 229, allowing the locking mechanism 200, including the tapered portion 229 and latching feature, to fit inside of the support cone 223 and engage therewith. In one embodiment, the geometry of the support cone 223 resembles a frusto-conical geometry. The support cone 223 is made of a material that can withstand insertion of the locking mechanism 200 without the need to expend significant effort to align the locking mechanism 200 and the support cone 223. In one embodiment, the support cone 223 further includes a geometry to receive a tapered footing structure 104, stairs 115, railing 117, or other suitable structures. The angle of the tapered surface is the same or dissimilar on opposite edges of the support cone 223. In the embodiment with the tapered surface having different angles, the fitting of the components is capable of being verified or customized to particular, predetermined components to prevent mis-assembly with insertion of incorrect components. In one embodiment, the support cone 223 is made of a material that can withstand the impact of the locking mechanism 200 being repeatedly and forcibly inserted into the support cone 223. Upon insertion of the support 103, the mating latching feature 203 of the retention device 211 latches the lip 218 or other surface or feature formed in the receiving member 207.

In one embodiment, the casing 225 of the receiving member 207 is an external portion of the receiving member 207, providing attachment to video module assembly 102 and providing structural support for the support cone 223. In one embodiment, the casing 225 is of a cuboid geometry. In one embodiment, the casing 225 has the geometry of a cube, other hexahedron, or any other suitable geometry with a top surface that is substantially planar and at least one side surface that is flat. because the substantially planar surface permits the casing 225 to be placed under the corner of a platform system 101 or under any other part of the platform system 101. In one embodiment, a collar 237 is attached to the casing 225 with fasteners or by other methods and provides alignment of engaging structures and protects the components within and on the receiving member 207. In one embodiment, the collar 237 is fitted with a cap or other structure to conceal the internal components, such as the support cone 223, of the receiving member 207 in the event that it is not desired to include structure on the upper side of the receiving member. The configuration of casing 225 allows for easier assembly of the platform system 101 because the receiving members 207 is capable of being treated as interchangeable and a plurality of video module assemblies 102 having receiving members 207 is capable of being brought together.

In one embodiment, the receiving member 207 includes at least one of the magnetic panels 227 on the side surface of the casing 225. The magnetic panel 227 allows for metal plates to be magnetically attached to the casing 225. Otherwise, the metal plates are attached with adhesives or hardware. In one embodiment, the metal plates of the receiving member 207 are attached to multiple casings 225 and provide a front surface for the stage, preventing people from walking underneath the platform system 101 and providing aesthetic benefits. In one embodiment, two flat side surfaces on the casing include the magnetic panels 227. The arrangement allows for the receiving member 207 to be placed under the corner of the platform system 101 or any other part of the platform system 101, allowing for easier assembly of the platform system 101 because the receiving members 207 can be treated as interchangeable.

In one embodiment, the locking mechanism 200 includes the retention device 211, an optional flange 215, the tapered portion 229, and the alignment member 213. The alignment member 213 includes at least one channel 217. The at least one channel 217 is capable of being configured to position the orientation of the locking mechanism 200 and, therefore, the support 103 (see FIG. 1A). To position the orientation of the locking mechanism 200, the channel 217 is lined up with the pin 219 within the receiving member 207. In this embodiment, the attachment portion 231 is within the releasing mechanism 209 inside the elongate portion 201.

In one embodiment, the tapered portion 229 of the receiving member is in engagement with an inner surface 501 of support cone 223. The inner surface 501 of the receiving member 207 support cone 223 includes an angle configured to receive the tapered portion 229. The angle of inner surface 501 is configured to provide a surface that engages the support 103 (see FIG. 1A) and resists lateral movement or flexing. In one embodiment, the platform system 101 includes a footing structure 104 connected to a railing 117 and/or stairs 115. Referring to FIG. 5, in one embodiment, the footing structure 104 is attached to an angled inner surface 504 and is capable of being engaged with an outer surface 503 of support cone 223 of receiving member 207. The outer surface 503 is configured with an angle that provides sufficient engagement and retention of the footing structure 104 that the railing 117, the stairs 115, and/or the or support 103 is substantially prevented from twisting or wrenching out. That is, the footing structure 104 permits unsupported placement of supports 103 into receiving members 207 having lengths of 8 feet or greater, while retaining a substantially perpendicular positioning and resisting tipping or falling over. Such unsupported placement permits the placement of a plurality of the supports 103 prior to providing an additional level of the video module assemblies 102 and the video modules 109, wherein additional levels are capable of being lifted onto the unsupported supports 103 with one or only a few personnel. In one embodiment, the outer surface 503 of support cone 223 and the casing 225 include a geometry forming a cavity capable of receiving the corresponding tapered footing structure 104.

Figure 6:
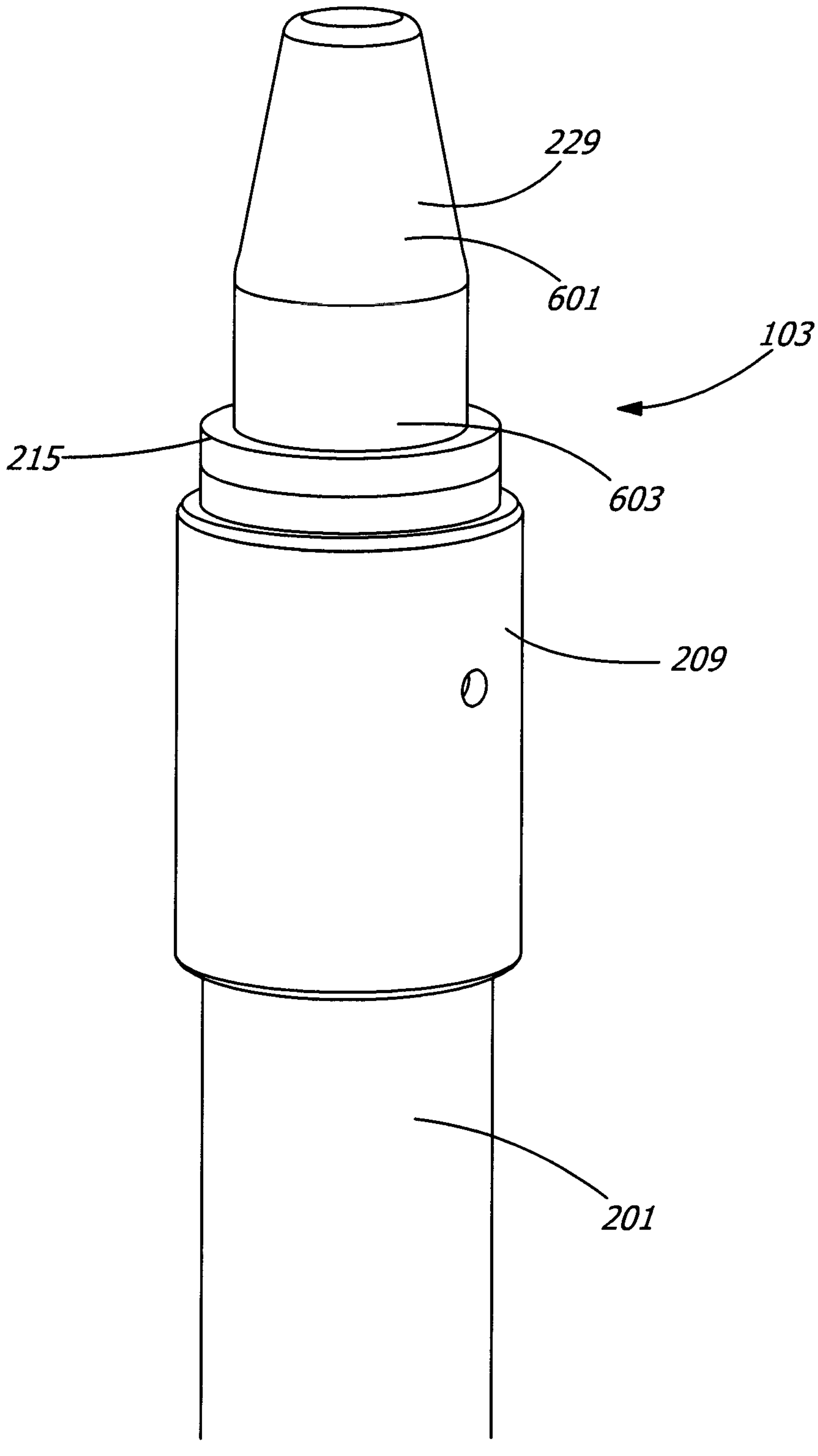
FIG. 6 shows a partial view of a support according to the disclosure.

Referring to FIG. 6, in one embodiment, the tapered portion 229 of the support 103 includes a first taper 601 and a barrel portion 603. The arrangement of support 103 in this embodiment permits the inclusion of addition devices or supports to be engaged with the tapered portion 229. For example, a support having openings corresponding to the barrel portion 603 is capable of being positioned over the barrel portion 603 and locked into place. Such supports are capable of being provided over spans or walkthroughs, for example, where laterally stabilizing supports 105 are undesirable.

Figure 7:
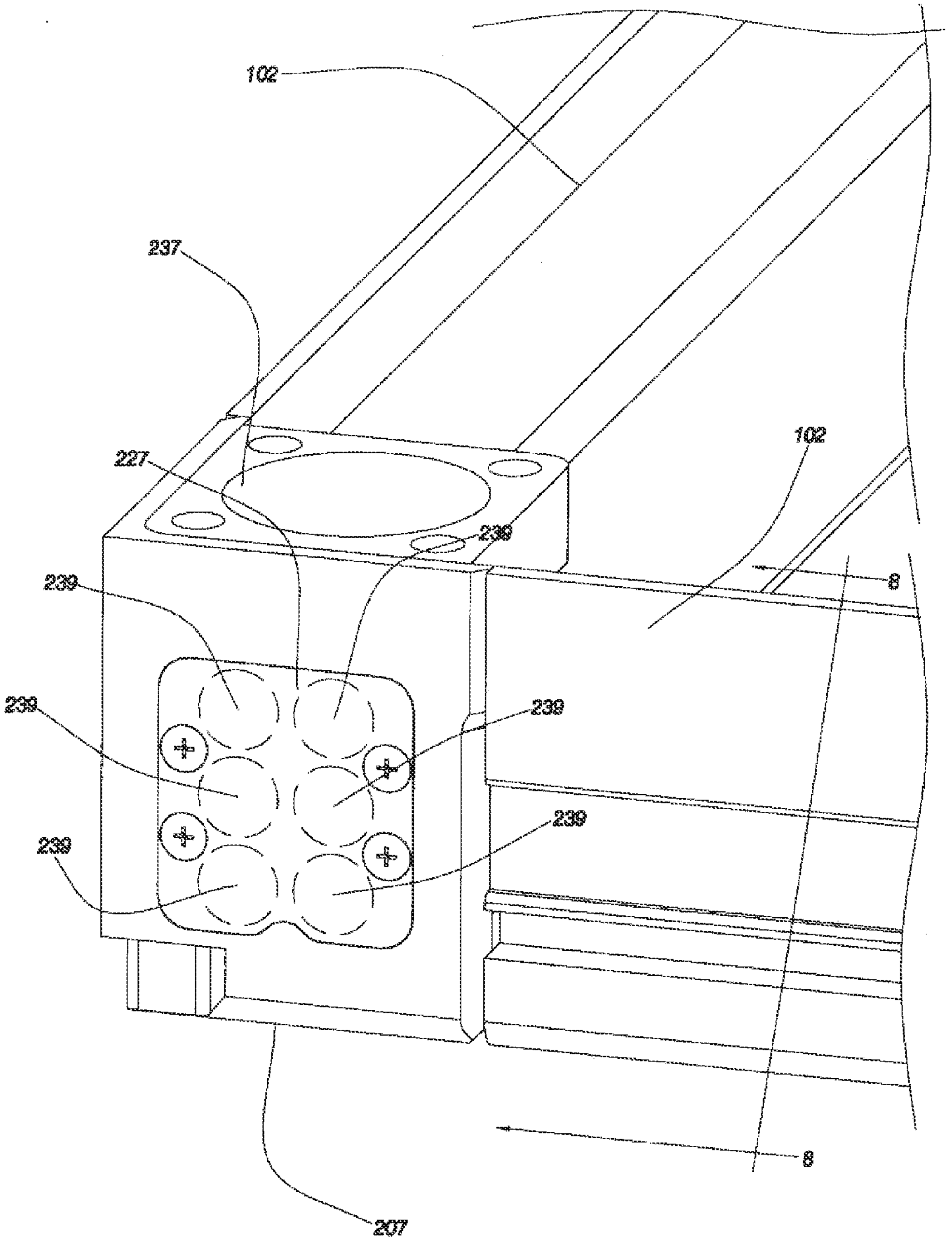
FIG. 7 shows a top perspective view of a portion of a video module assembly and receiving member according to the disclosure.

FIG. 7 shows a portion of the platform system 101 with the video module assembly 102 attached to the receiving member 207. In one embodiment, the magnetic panel 227 is configured to provide magnets 239 arranged to align and engage adjacent video module assemblies 102 and magnetic panels 227. As discussed above, in one embodiment, the magnets 239 are disposed in a north-south-north polarity arrangement to provide the alignment. In addition, as shown, the video module assembly 102 is attached to the receiving member 207. The attachment is provided by any suitable attachment technique, including welding, adhesive, fasteners, interlocking or any other attachment that provide sufficient retention to support the video module assembly 102, the video module 109, and/or any load thereon.

Figure 9:
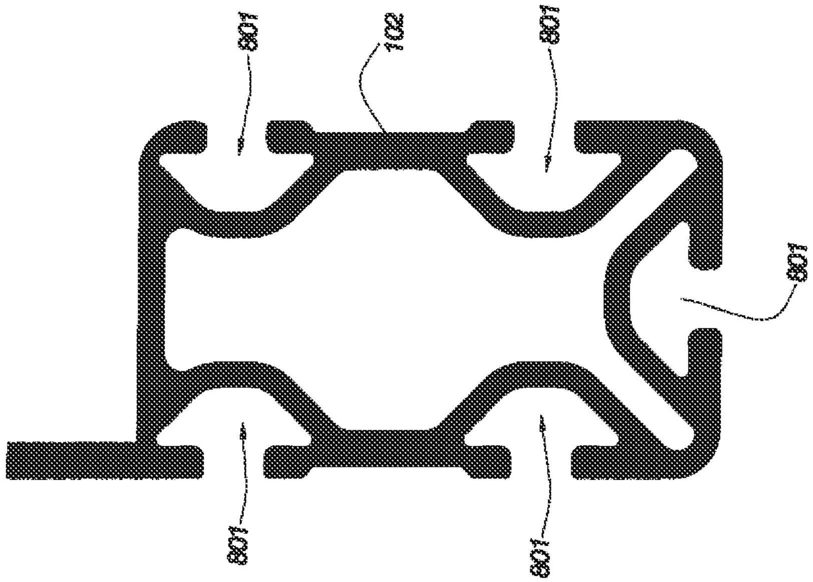
FIG. 9 shows a sectional view of a video module assembly according to the disclosure.
Figure 8:
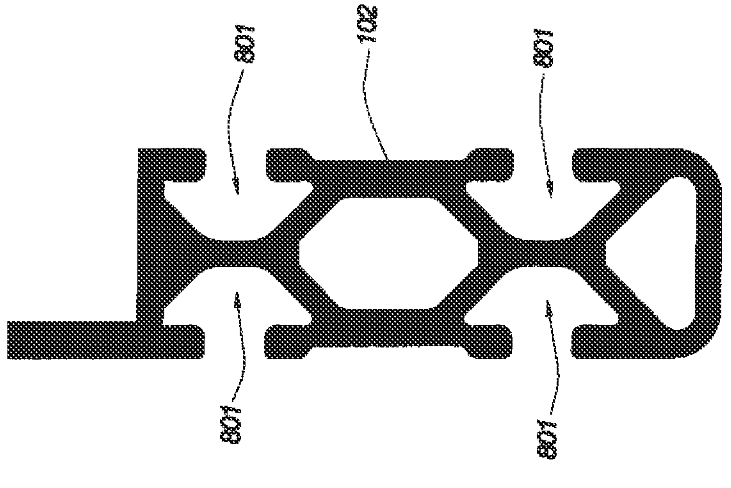
FIG. 8 shows a sectional view of a video module assembly according to the disclosure.

Referring to FIGS. 7-9, in one embodiment, the video module assembly 102 includes locking cavities 801 into which accessories or other devices are capable of being inserted and locked into position. In one embodiment, such accessories or devices include aesthetic components, theatrical components, structural components, or any other components useful for attachment to video module assembly 102.

FIG. 14A shows a partial exploded view of the platform system 101 of FIG. 1A. As shown in FIG. 14A, the system 101 includes a plurality of the video module assemblies 102 supported by supports 103, a plurality of the laterally stabilizing supports 105, and a plurality of the video modules 109 thereon. In addition, the video module assemblies 102 each include the receiving member 207. The support 103 in the single level portion 113 includes laterally stabilizing supports 105 that engage the video module assembly 102 and the laterally stabilizing support structure 107. The laterally stabilizing supports 105 provide increased resistance to lateral forces. The supports 103 include tapered portions 229, which are received by receiving member 207. To release the supports 103, the releasing mechanism 209 is actuated, preferably by hand, and the support 103 is removed from the receiving member 207. In the multilevel portion 110, the supports 103 include footing structures 104 that have an inward taper (see FIG. 5), which is received by the lower receiving members 207. While the attachment of the tapered footing structures 104 is shown and described as a gravity fit, other attachment are capable of being provided, including latches, fasteners or interlocking features of the mating components.

Figure 15:
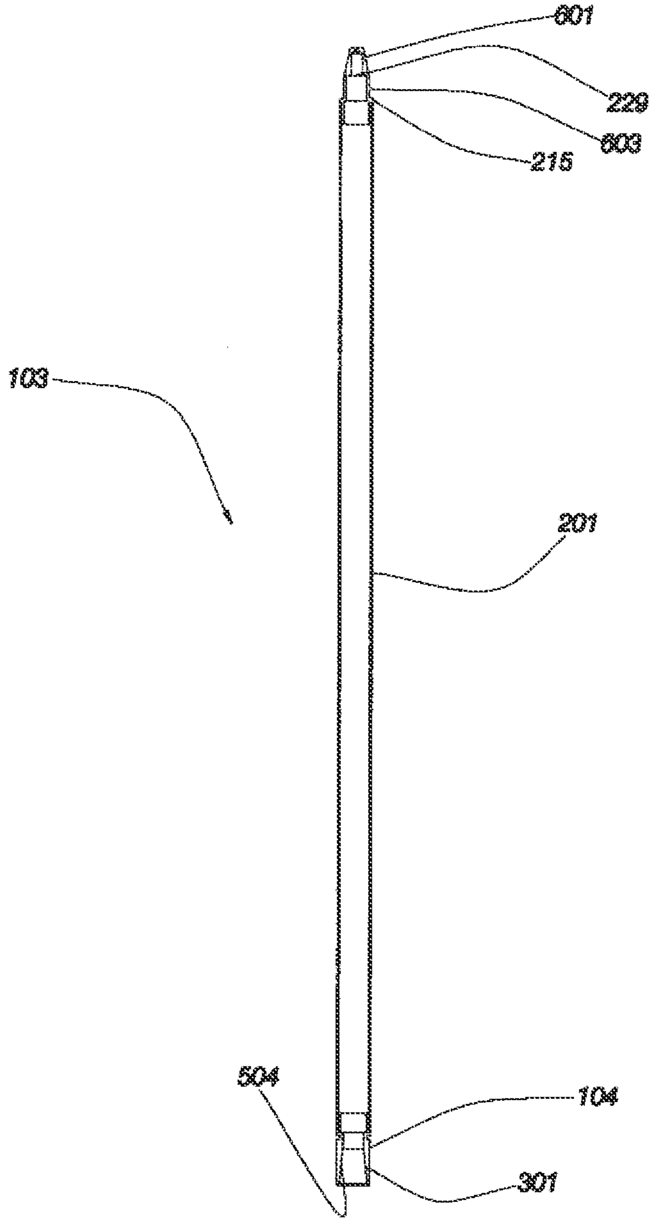
FIG. 15 shows a cross-sectional view of a support according to the disclosure.

FIG. 15 shows an embodiment of the support 103. The support 103 includes a tapered portion 229 and a footing structure 104 having the coupling member 301. The coupling member 301 includes an angled inner surface 504 having an angle that correspondingly mates with the outer surface 503 of support cone 223 of a corresponding receiving member 207 (see FIGS. 5 and 19). The angle of the outer surface 503 and the inner surface 504 is such that the support 103 is capable of maintaining unsupported perpendicular positioning (i.e., substantially perpendicular to video module 109) (see e.g., multiple level portion 110 of FIGS. 1 and 14A), during assembly.

Figure 19:
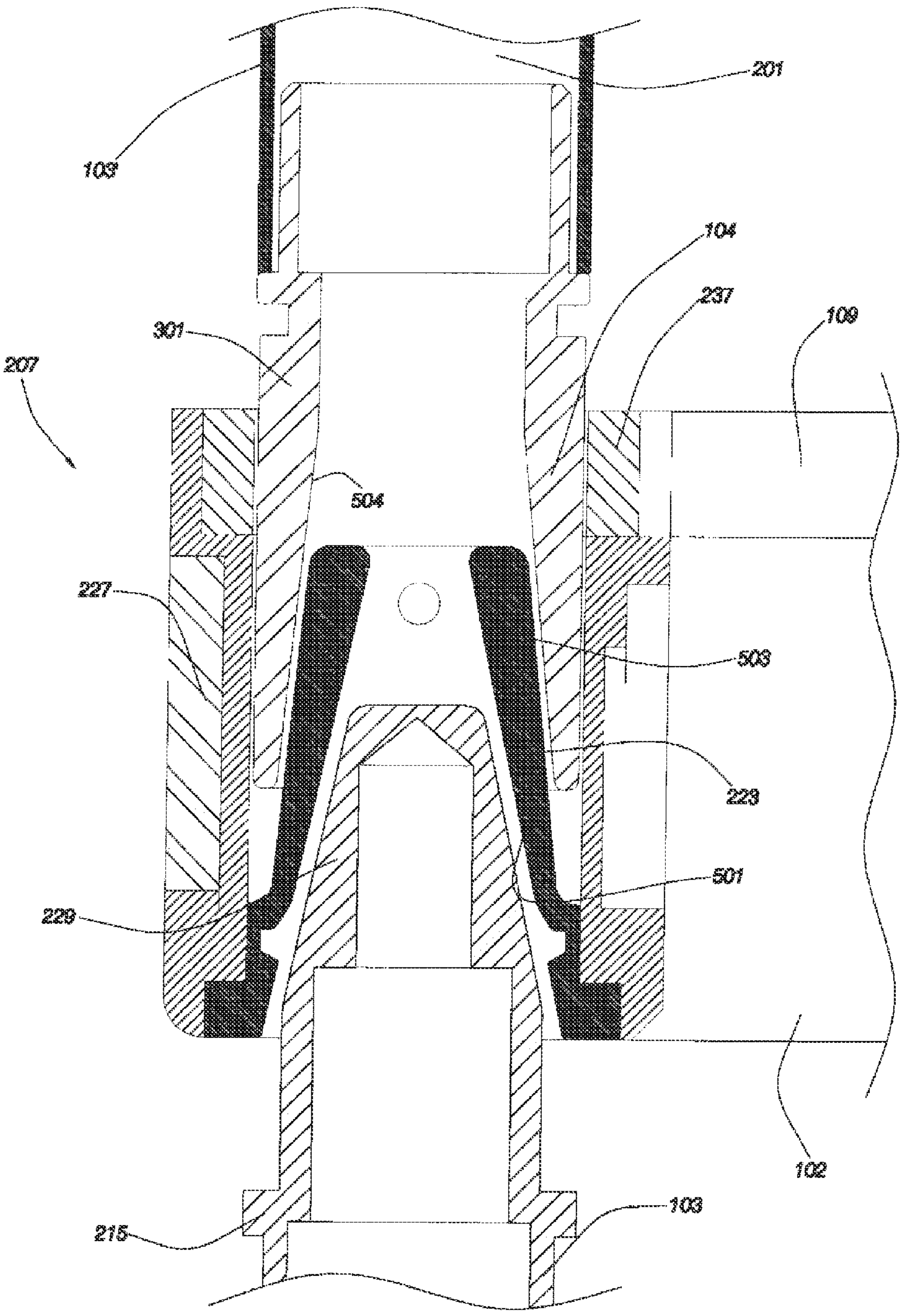
FIG. 19 shows a partial cross-sectional view of a video module assembly with supports attached above and below according to the disclosure.

FIG. 19 shows an embodiment of the support 103 connected into a receiving member 207 from below and a second support 103' engaging receiving member 207 from above. In this embodiment, the tapered portion 229 is frictionally engaged with the receiving member 207 and the coupling member 301 is frictionally engaged with the receiving member 207. While the above have been shown with multilevel portions 110 having tapered portions 229 having no latching members 203, the supports 103 of the multiple level portions 110 are capable of also having latching members 203, grooves, features, and interlocking features utilized to further provide engagement between the support 103 and receiving member 207.

In one embodiment, the platform system 101 includes the support 103 attached as part of a fence system (not shown). The fence system is capable of including regular fencing materials, metal sheets, vinyl sheets, plastic sheets, wood panels, or any other material that is able to be affixed to the flat portions of the receiving member 207.

Still another embodiment of the present disclosure includes a platform system 101 with the support 103 attached as part of a scaffolding system (not shown).

FIG. 2 further shows an embodiment of the platform system 101 including the laterally stabilizing support structure 107, having a set of the hook members 221. Hook members 221 are arranged to permit at least one of the laterally stabilizing supports 105 to be attached to the laterally stabilizing support structure 107 allowing increased stability for the platform system 101. The engagement of the locking mechanism 200 with the receiving member 207 includes a rotational positioning that arranges the hook members 221 in an orientation that permits placement and locking engagement of the laterally stabilizing supports 105 to the support 103 and to the video module assembly 102. The laterally stabilizing supports 105 are capable of being fastened to the video module assembly 102 in any suitable manner, including by fasteners, latches, hooks or other clipping or retaining structures.

Referring to FIG. 2, in one embodiment, the laterally stabilizing support structure 107 is attached circumferentially to the elongate portion 201. In an embodiment, the laterally stabilizing support structure 107 is positioned at or near the end of the support 103 opposite the receiving member 207. The laterally stabilizing support structure 107 is capable of being positioned anywhere on the elongate portion 201. In one embodiment, the laterally stabilizing support structure 107 is positioned at or near the end of the support 103 opposite the receiving member 207, providing increased stability. In another embodiment of the laterally stabilizing support structure 107 includes a hook member 221 (see FIG. 12). The hook member 221 allows for at least one laterally stabilizing support 105 to be attached to the support 103, allowing increased stability for the platform system (see FIG. 1A).

Referring to FIG. 1A, in one embodiment, the laterally stabilizing support 105 is attached to the laterally stabilizing support structure 107 and to another structure. For example, the other structure is a fitting on the stage or platform, another laterally stabilizing support structure 107 on another support 103, a fitting on another support 103, or a fitting on an additional support. In one embodiment, the laterally stabilizing supports 105 are engaged and secured by the support locks 744 (see support locks in FIG. 23). In one embodiment, the laterally stabilizing support structures 107 are located at ninety degrees, circumferentially, on the support 103 (see FIG. 12). In one embodiment, the laterally stabilizing supports 105 for the internal supports 103 are attached to four laterally stabilizing supports 105 radiating from the support 103. In one embodiment, there are two laterally stabilizing supports 105 on the supports 103 located on the corner of the platform system 101. In one embodiment, there are two laterally stabilizing supports 105 on the supports 103 that are on the outside perimeter of the platform system 101. This configuration of the laterally stabilizing supports 105 permits stability with a minimal amount of obstruction. Nonetheless, any or all of the laterally stabilizing supports 105 are capable of being removed.

Figure 12:
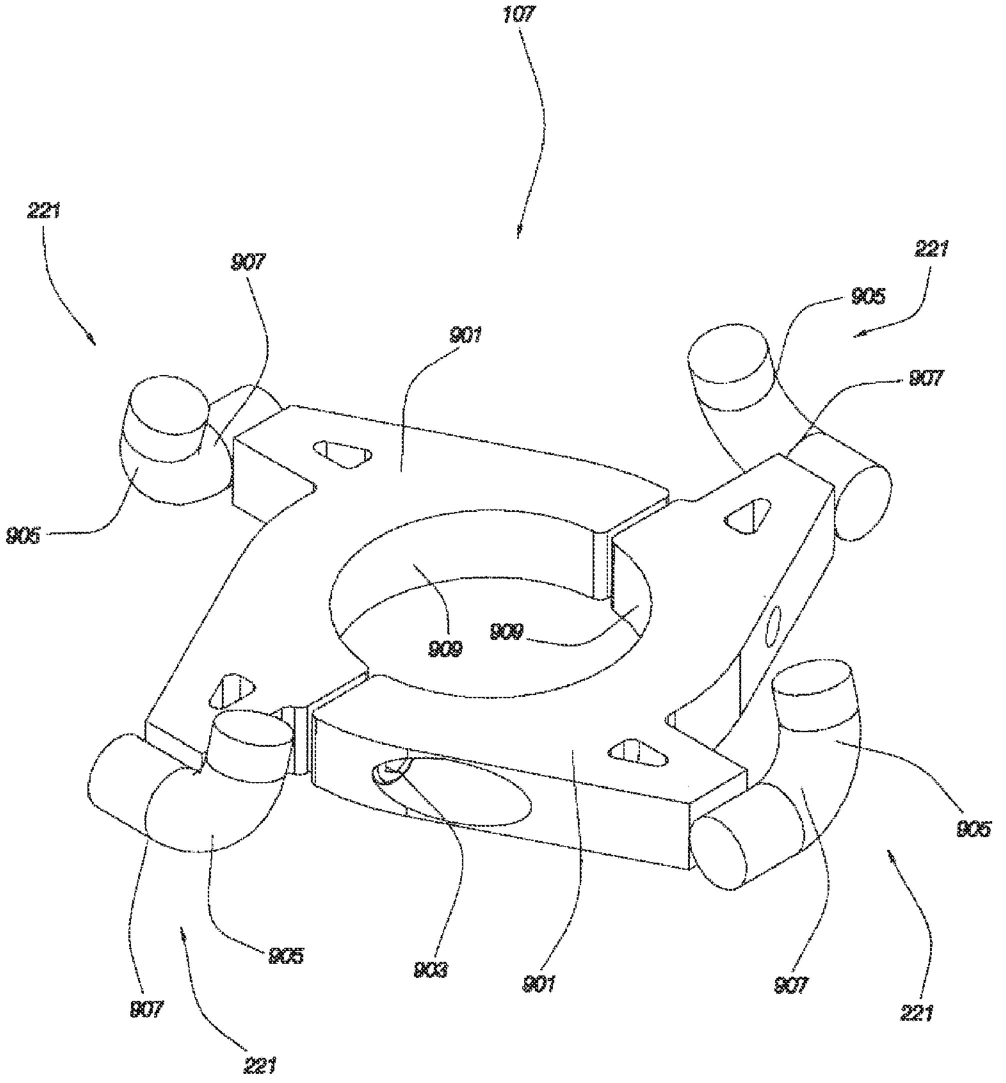
FIG. 12 shows a top perspective view of a laterally stabilizing support structure according to the disclosure.

FIG. 12 shows the laterally stabilizing support structure 107 including a plurality of hook portions 221. The hook portions 221 extend from a laterally stabilizing support structure attachment portion 901. The laterally stabilizing support structure attachment portion 901 includes a geometry that is suitable for attachment to the support 103. The attachment portion 901 embodiment shown in FIG. 12 includes a pair of clamp-like structures that are fastened together by fasteners 903. The attachment portion 901 includes an attachment surface 909 that attaches to the support 103 (see FIG. 2) upon sufficient engagement of fasteners 903 to draw the attachment surfaces 909 into compressive contact with the support 103. In one embodiment, the compressive contact is achieved with a connector of fastener that constantly provides an inward force. The attachment portion 901 is not limited to the geometry shown in FIG. 12. For example, in one embodiment, the attachment 901 includes a geometry that permits the attachment of the laterally stabilizing support structure 107 to the support 103. In one embodiment, the attachment of the laterally stabilizing support structure 107 to the support 103 takes place using any suitable method, including frictional attachment provided by fasteners 903, adhesive, thermal shrink fit, welding or providing a unitary support 103 having the structure of the laterally stabilizing support structure 107 integrally included. Although FIG. 12 shows four hook portions 221. In other embodiments, the laterally stabilizing support structure 107 includes any number of hook portions 221 and includes a hook portion 221 for each elongate portion 103 that is in locking engagement with the laterally stabilizing support structure 107. Additionally, in one embodiment, the laterally stabilizing support structures 107 is fabricated with a symmetrical arrangement of hook portions 221, such as the four hook portions 221 shown in FIG. 12, for ease of assembly and alignment of the support 103 when the platform system 101 is assembled. In one embodiment, the hook portions 221 include a curved portion 905 that has a radius of curvature that allows a laterally stabilizing support connector 1301 of a laterally stabilizing support 105 (see FIGS. 13A and 13B) to be directed over the hook portion 221. The curved portion includes an engagement surface 907 that is capable of engaging the laterally stabilizing support connector 1301 and reacting to forces transmitted through the laterally stabilizing support 105. When the laterally stabilizing support connector 1301 is in position and in engagement with the engagement surface 907, the curved portion 905 locks the laterally stabilizing support connector 1301 in place and prevents disengagement, thereby retaining the laterally stabilizing support 105 in locking engagement.

Figure 13A:
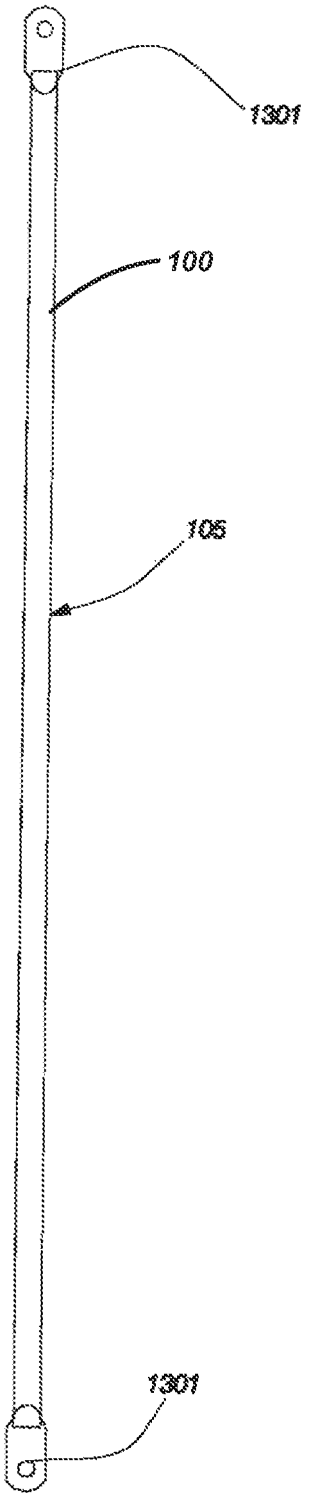
FIGS. 13A and 13B show orthogonal views of a laterally stabilizing support according to the disclosure.
Figure 13B:
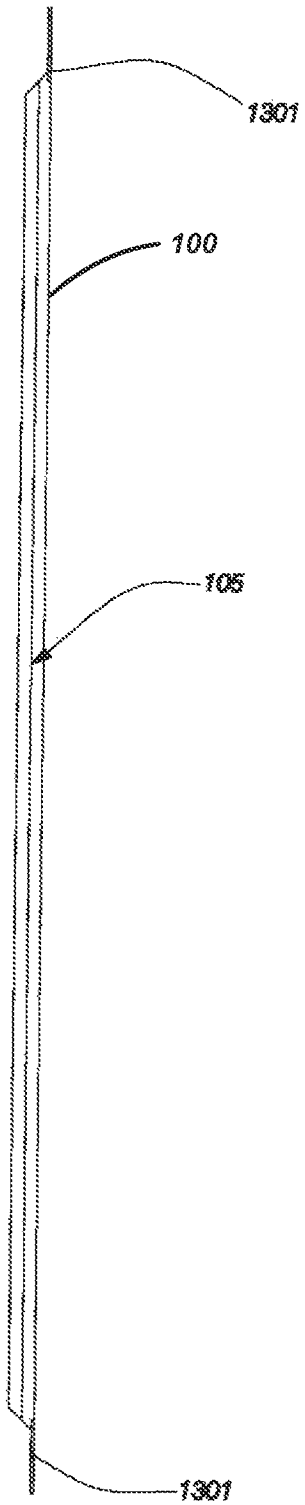

FIGS. 13A and 13B illustrate two orthogonal views of the laterally stabilizing support 105 according to an embodiment of the invention. In one embodiment, the laterally stabilizing support 105 includes the elongate portion 100 having a substantially cylindrical geometry, and two laterally stabilizing support connectors 1301, disposed, one at each opposing end. In one embodiment, the laterally stabilizing support 105 includes any suitable geometry capable of transferring force from the video module assembly 102 to the supports 103 when the platform system 101 is assembled (see FIG. 1A). As discussed above with respect to FIG. 1A, in one embodiment, the laterally stabilizing support connectors 1301 include any structure, such as eyelets, for example, that is suitable for engaging the video module assembly 102 and the laterally stabilizing support structure 107 on the support 103. The laterally stabilizing support structure at each end of the laterally stabilizing support 105 are the same configuration, or the laterally stabilizing support connector 1301 connectors have different configurations from each other. In addition, the laterally stabilizing support connector 1301 is capable of being configured in any suitable geometry that includes one end that is capable of detachably engaging the video module assembly 102 and one end that is capable of being in locking engagement to the laterally stabilizing support structure 107.

Figure 10:
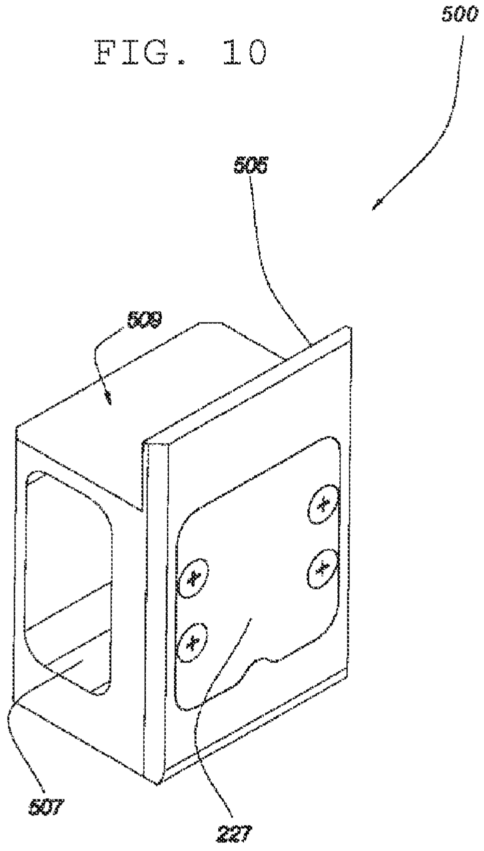
FIG. 10 shows a top perspective view of a casing attachment according to of the disclosure.
Figure 11:
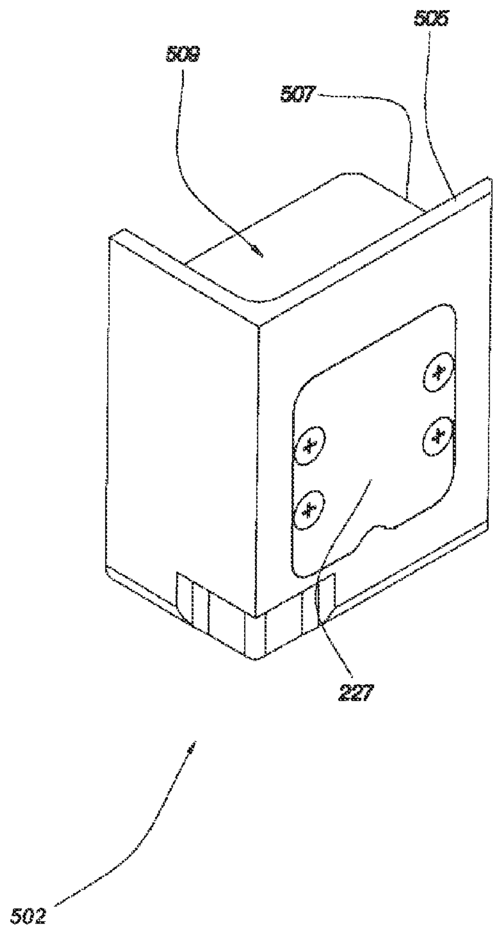
FIG. 11 shows a top perspective view of a casing attachment according to the disclosure.

FIGS. 10 and 11 show additional support structure to attach to or otherwise engage video module assembly 102. The additional support corresponds to the structures selected from the group consisting of a longitudinal casing attachment 500, a latitudinal casing attachment 502, and any combinations thereof. The longitudinal casing attachment 500 (see FIG. 10) includes the casing attachment panel 505, which in one embodiment is the magnetic panel 227, as shown and described above in FIG. 3, and the alternative support slot 507. The latitudinal casing attachment 502 (see FIG. 11) includes the casing attachment panel 505 and the alternative support slot 507. In one embodiment, the casing attachment panel 505 includes several screws for attaching the casing attachment panel 505 to the casing 225; however, the casing attachment panel 505 is capable of being attached to the casing 225 by using the magnetic panels 227, an adhesive, welding, or any other suitable method of attachment. The support slots 507 receive video module assembly 102 and are supported thereby. The width and height of the additional supports is capable of being modified to fit specific needs of the platform system 101. The longitudinal casing attachment 500 has a narrower width and a taller height. The latitudinal casing attachment 502 has a wider width and a shorter height. The longitudinal casing attachment 500 and the latitudinal casing attachment 502 further include a panel support area 509, which is arranged to receive the video module 109, when the platform system 101 is assembled. In one embodiment, the casing 225 works in conjunction with both the longitudinal casing attachment 500 and the latitudinal casing attachment 502. The alternative support slot 507 has any geometry configured to the additional support. In one embodiment, the alternative support slot 507 includes a rectangular opening permitting a wood plank to be inserted into the alternative support slot 507 as the additional support; however, the additional support can be made of any material sufficient to provide the necessary support.

Referring again to FIG. 1A, in one embodiment, the platform system 101 includes wheels 106, which provide contact with the underlying surface of the platform system 101. In one embodiment, the support plates 742 are configured for attachment of the wheels 106 to the platform system 101. Although wheels 106 are shown, other structures may be utilized including, but not limited to, rollers, fixed feet, stakes, posts, or other structures suitable for engaging the surface underlying the platform system 101. As shown in the multilevel portion 110, the wheels 106 are attached to the video modules 109 and/or video module assembly 102 to permit rolling or moving of the platform system 101, even after assembly. Likewise, the single level portion 113 includes footing structures 104 having wheels that are attached to the support 103 and permit rolling or moving of the platform system 101, even after assembly. In another embodiment, the footing structures 104 are substituted with a stabilizing device. In one embodiment, the stabilizing device is a device formed of a solid substance (such as concrete, plastic, or other solids that can be worked with in liquid form), a mechanical system providing shock absorption, or other systems sufficient to provide stability for the support 103 and/or video module assembly 102.

In one embodiment, the receiving members 207 are configured in the video module assembly 102 to permit engagement with supports 103 from either the top surface or from the bottom to permit stacking of platform levels. That is, supports are mated to the receiving member 207 from two directions, permitting the formation of multiple levels. Although the multilevel portion 110 is shown as two platform levels, any number of additional levels are capable of being formed. In addition, the distance between platform levels is capable of being varied by providing supports 103 of varying lengths on each level.

Referring again to FIG. 1A, in one embodiment, the receiving members 207 are configured to engage with additional staging structures desirable for staging or platform use. For example, in one embodiment, as shown in FIG. 1A, additional staging structures, such as the stairs 115, engaged to the platform system 101 by insertion of a portion thereof into receiving members 207. Likewise, in another embodiment, the railings 117 are inserted into the receiving members 207. The engagement includes any suitable engagement into receiving member 207, including, but not limited to gravity, interlocking, latching or magnetic attraction. In other embodiments, other staging structures are likewise be engaged to the platform system 101 by engagement with the receiving member 207.

In addition, the embodiment shown in FIG. 3 includes a second support 103' extending from the receiving member 207. Although the embodiment shown includes a second support 103', in other embodiments, the stairs 115, the railings 117 or other structures include the footing structure 104 configured to engage support cone 223 of receiving member 207 and engaged with the receiving member 207 (see FIG. 1A).

In one embodiment, the footing structure 104 on the support 103 includes a frusto-conical geometry or similar geometry. Tapered, frusto-conical, and conical geometry of the footing structure 104 on the support allow the support 103 to stand without additional support. This allows additional supports 103 to be positioned on the platform system 100. In one embodiment, once the supports 103 are all positioned and engaged, a second platform system 101 is positioned and engaged at the distal end of the receiving member 207 of the support 103. The second platform system 101 forms the second level for a multilevel portions of the platform system 101. In one embodiment, the process is repeated horizontally and/or vertically to produce a larger platform or stage on multiple levels. Tapered, frusto-conical, and conical geometry of the tapered portion 229 of the support 103 distribute the lateral forces allowing the platform system 101 to maintain stability, without swaying or bending, even when there are lateral forces present. In addition, the tapered, frusto-conical, and conical geometry help prevent misalignment of the support 103 by providing an engagement surface. Also, the support cone 223 aligns itself and allows workers having little or no technical skill to assemble the platform systems 101 quickly and easily. Disassembly is also easily achieved by reversing this process.

Figure 17:
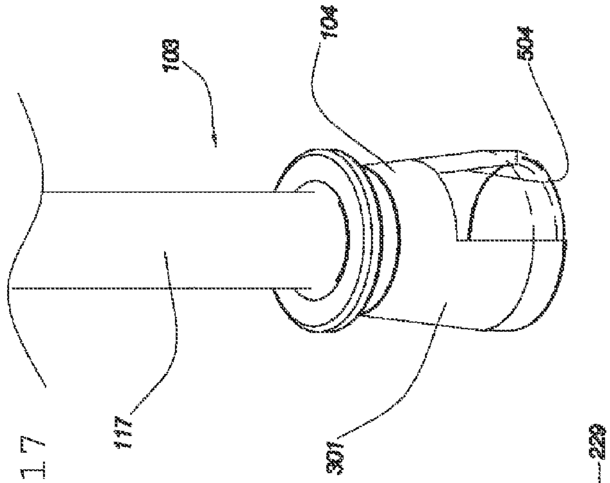
FIG. 17 shows a perspective view of a tapered footing structure according to the disclosure.
Figure 16:
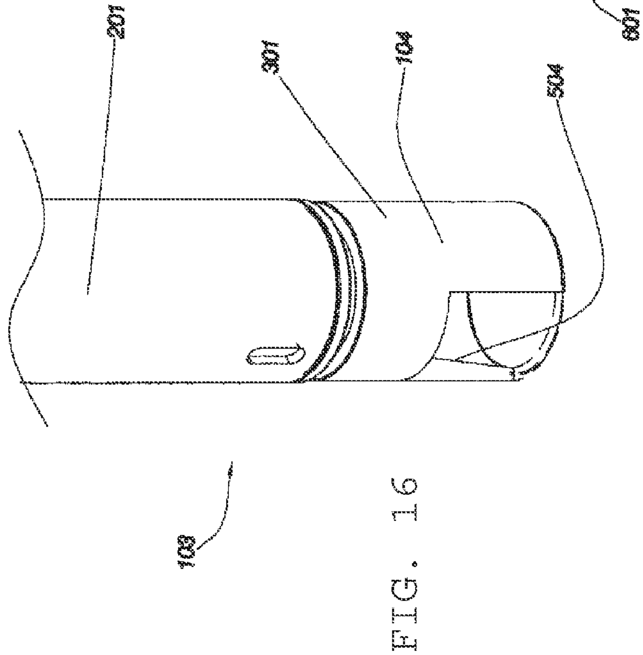
FIG. 16 shows a perspective view of a footing structure according to the disclosure.

FIG. 16 shows the coupling member 301 as the footing structure 104, wherein the coupling member 301 includes an inner surface 504 and attaches to the elongate portion 201. FIG. 17 shows a coupling member 301 as the footing structure according to an alternate embodiment, wherein the coupling member 301 is configured to attach to the railing 117 or be configured to attach to the stairs 115 (see FIG. 1A).

Figure 18:
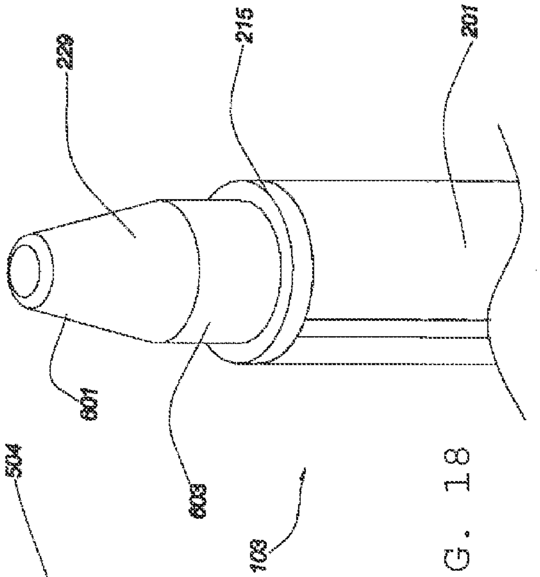
FIG. 18 shows a perspective view of a portion of support according to the disclosure.

Referring to FIGS. 14A and 18, in one embodiment, the multilevel portion 110 includes the support 103 with the tapered portion 229 including the flange 215, a first taper 601 and a second barrel portion 603. The tapered portion 229 is attached to elongate portion 201. During assembly, as discussed above, the supports 103 are preferably positioned, unsupported on a level of video modules 109, video module assemblies 102 and receiving members 207. By unsupported, it is meant that all of the support is provided by the engagement of the tapered portion 229 and the support cone 223. A receiving member 207 of an upper level of video modules 109, video module assemblies 102 may be positioned over the tapered portion 229 and is permitted to engage.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A platform system having a video module assembly, the video module assembly comprising:

a receiving member; and a first video module removably secured to the receiving member;

wherein the video module includes an array of light emitting devices;

wherein the video module includes a transparent deck having an exposed surface and a concealed surface configured to support structural loads on the exposed surface;

wherein the video module includes at least one dampening rod arranged and disposed to provide vibration dampening for reducing noise and impact stresses at the concealed surface and forming a space gap; and wherein the receiving member is configured to directly or indirectly detachably engage a second video module.

2. The system of claim 1, wherein the array of light emitting devices produces a moving video image across the first video module and the second video module.

3. The system of claim 1, wherein the video module is configured to deform or deflect to provide vibration and noise dampening

4. The system of claim 1, wherein the video module includes the deck, a contoured video panel and a control panel.

5. The system of claim 4, wherein the contoured video panel includes at least one channel and at least one protrusion member.

6. The system of claim 5, wherein the ratio of the thickness of the deck to the thickness of the protrusion members is from about 0.75 to about 2.0.

7. The system of claim 5, wherein the channels are arranged to run parallel to and between the protrusion members to form a contoured surface.

8. The system of claim 5, wherein light emitting devices are arranged and disposed within the channels such that their longitudinal edges abut the sidewalls on either side of the channels.

9. The system of claim 5, wherein the protrusion members include opposing sidewalls and at least one groove formed within opposing surface ridges.

10. The system of claim 6, wherein the channels are configured to house light emitting devices within that are capable of producing an image or video display.

11. The system of claim 5, wherein the protrusion includes the dampening rods arranged and disposed in the groove.

12. The system of claim 1, wherein the light emitting devices are LED strips.

13. The system of claim 1, wherein the video module assembly includes a connector having at least one of a rotatable latch member or a receiving member.

14. The system of claim 1, wherein the video module assembly includes a connector configured to apply a constant force between the video module assembly and the receiving member.

15. The system of claim 1, wherein the video module assembly includes a connector configured to apply a constant force between the video module assembly and an adjacent video module assembly.

16. The system of claim 1, wherein the system produces a moving image across the video module assembly and one or more other video modules.

17. The system of claim 1, wherein the system includes one or more non-video modules.

18. The system of claim 17, wherein the one or more non-video module includes a trap door or a grate.

19. A video module assembly comprising:

a receiving member; and a first video module removably secured to the receiving member;

wherein the video module includes an array of light emitting devices;

wherein the video module includes a transparent deck having an exposed surface and a concealed surface configured to support structural loads on the exposed surface;

wherein the video module includes at least one dampening rod arranged and disposed to provide vibration dampening for reducing noise and impact stresses at the concealed surface and forming a space gap;

wherein the receiving member is configured to directly or indirectly detachably secure a second video module; and wherein the receiving member has a casing including a support cone configured to receive a tapered portion of a support, the support cone having a tapered inner surface and a tapered outer surface, the outer surface and the casing forming a cavity capable of receiving a corresponding tapered footing structure, the inner surface and outer surface being engagable with mating tapered surfaces, and at least one of the tapered surfaces being the tapered portion.

20. A method of assembling a platform system comprising:

providing a platform system comprising a receiving member and a first video module removably secured to and supported by the receiving member;

wherein the video module includes a transparent deck having an exposed surface and a concealed surface configured to support structural loads on the exposed surface;

wherein the video module includes at least one dampening rod arranged and disposed to provide vibration dampening for reducing noise and impact stresses at the concealed surface and forming a space gap;

directly or indirectly detachably securing a second video module with the receiving member;

wherein the first video module includes an array of light emitting elements.

* * * * *